United States Patent
Oh et al.

(10) Patent No.: US 10,266,770 B2
(45) Date of Patent: Apr. 23, 2019

(54) LIQUID CRYSTAL COMPOSITION, LIQUID DISPLAY, AND METHOD OF MANUFACTURING LIQUID CRYSTAL DISPLAY

(71) Applicant: Samsung Display Co., Ltd., Yongin-si, Gyeonggi-do (KR)

(72) Inventors: Keun Chan Oh, Cheonan-si (KR); Jun Hyup Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/410,587

(22) Filed: Jan. 19, 2017

(65) Prior Publication Data

US 2017/0130130 A1 May 11, 2017

Related U.S. Application Data

(62) Division of application No. 14/223,686, filed on Mar. 24, 2014, now Pat. No. 9,606,401.

(30) Foreign Application Priority Data

May 3, 2013 (KR) .................. 10-2013-0050280

(51) Int. Cl.
*C09K 19/56* (2006.01)
*G02F 1/1337* (2006.01)
(Continued)

(52) U.S. Cl.
CPC ............ *C09K 19/56* (2013.01); *G02F 1/1341* (2013.01); *G02F 1/133711* (2013.01);
(Continued)

(58) Field of Classification Search
CPC ......... G02F 1/133711; G02F 1/133788; G02F 1/133753; G02F 2001/133726;
(Continued)

(56) References Cited

U.S. PATENT DOCUMENTS 8,268,190 B2 9/2012 Wu
8,269,935 B2 9/2012 Kuo et al.
(Continued)

FOREIGN PATENT DOCUMENTS

CN 102241988 A 11/2011
CN 102356350 A 2/2012
(Continued)

OTHER PUBLICATIONS

First Office Action dated Jun. 28, 2017 for Chinese Patent Application No. CN 201410183474.4, which shares priority of Korean Patent Application No. KR 10-2013-0050280 with subject U.S. Appl. No. 15/410,587, and which cites the above-identified references numbered 1-6.

(Continued)

*Primary Examiner* — Ruiyun Zhang
(74) *Attorney, Agent, or Firm* — Lewis Roca Rothgerber Christie LLP

(57) ABSTRACT

In an aspect, an liquid crystal display including a first substrate, a second substrate facing the first substrate, and a liquid crystal layer interposed between the first substrate and the second substrate and including liquid crystals, a first alignment polymer, and a second alignment polymer is provided, In an aspect, the first alignment polymer is formed by radiating electromagnetic radiation on a first alignment aid photoreactive in a first wavelength region, the second alignment polymer is formed by radiating electromagnetic radiation on a second alignment aid photoreactive in a second wavelength region, and the first wavelength region and the second wavelength region are different from each other.

6 Claims, 8 Drawing Sheets

(51) Int. Cl.
*G02F 1/1341* (2006.01)
*C09K 19/04* (2006.01)

(52) U.S. Cl.
CPC .. *G02F 1/133753* (2013.01); *G02F 1/133788* (2013.01); *C09K 2019/0448* (2013.01); *G02F 2001/133742* (2013.01); *G02F 2202/023* (2013.01); *G02F 2203/055* (2013.01); *Y10T 428/10* (2015.01); *Y10T 428/1005* (2015.01)

(58) Field of Classification Search
CPC ........ G02F 2001/133765; G02F 2001/133742; C09K 19/56; C09K 2019/546; C09K 2019/548; Y10T 428/10; Y10T 428/1005; Y10T 428/1036
USPC ............ 428/1.1, 1.2, 1.3; 349/127, 130, 136
See application file for complete search history.

(56) References Cited

U.S. PATENT DOCUMENTS

| | | |
|---|---|---|
| 2004/0188653 A1 | 9/2004 | Kataoka et al. |
| 2009/0146104 A1 | 6/2009 | He et al. |
| 2010/0103357 A1 | 4/2010 | Kye et al. |
| 2010/0103366 A1 | 4/2010 | Farrand et al. |
| 2010/0182556 A1 | 7/2010 | Oh et al. |
| 2010/0283951 A1 | 11/2010 | Lee et al. |
| 2011/0051065 A1 | 3/2011 | Seong et al. |
| 2011/0228207 A1 | 9/2011 | Lee et al. |
| 2012/0008079 A1 | 1/2012 | Mizusaki et al. |
| 2012/0050847 A1 | 3/2012 | Watanabe |

FOREIGN PATENT DOCUMENTS

| | | |
|---|---|---|
| CN | 103509560 A | 1/2014 |
| EP | 1 065 553 A1 | 1/2001 |
| JP | 2004-123829 A | 4/2004 |
| JP | 2004-529214 A | 9/2004 |
| JP | 2004-286984 A | 10/2004 |
| JP | 2004-302061 A | 10/2004 |
| JP | 2006-225655 A | 8/2006 |
| JP | 2007-169363 A | 7/2007 |
| JP | 2008-076950 A | 4/2008 |
| JP | 2012-113132 A | 6/2012 |
| KR | 10-2007-0002465 A | 1/2007 |
| KR | 10-2010-0003565 | 1/2010 |
| KR | 10-2010-0121005 | 11/2010 |
| KR | 10-2011-0021587 | 3/2011 |
| KR | 10-2012-0059417 A | 6/2012 |
| KR | 10-2012-0060160 A | 6/2012 |
| KR | 10-1157948 B1 | 6/2012 |
| KR | 10-2012-0113482 | 10/2012 |
| TW | 201302995 A1 | 1/2013 |
| TW | 201307537 A1 | 2/2013 |
| WO | WO 02/44304 A1 | 6/2002 |
| WO | WO 2011/098461 A1 | 8/2011 |
| WO | WO 2012/165550 A1 | 12/2012 |
| WO | WO 2013/026691 A1 | 2/2013 |
| WO | WO 2013/038969 A1 | 3/2013 |

OTHER PUBLICATIONS

First Chinese Office Action dated Mar. 13, 2018 for Chinese Patent Application No. CN 201410183474.4, which cites the above-identified reference numbered 1, and which shares priority of Korean Patent Application No. KR 10-2013-0050280, filed May 3, 2013, with subject U.S. Appl. No. 15/410,587.

Extended European Search Report dated Sep. 25, 2014 for European Application No. EP 14 166 567.9.

Japanese Office Action dated May 28, 2018 for Japanese Patent Application No. JP 2014-094916, which cites the above-identified references numbered 1-3, and which shares priority of Korean Patent Application No. KR 10-2013-0050280 with subject U.S. Appl. No. 15/410,587.

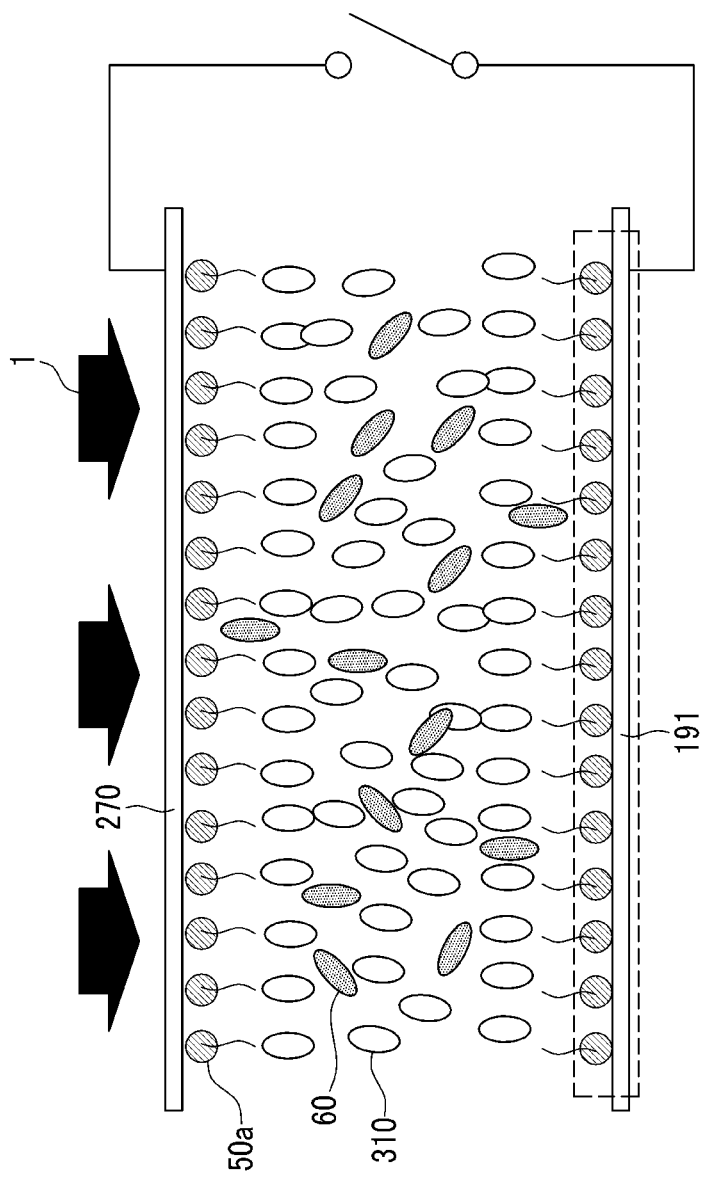

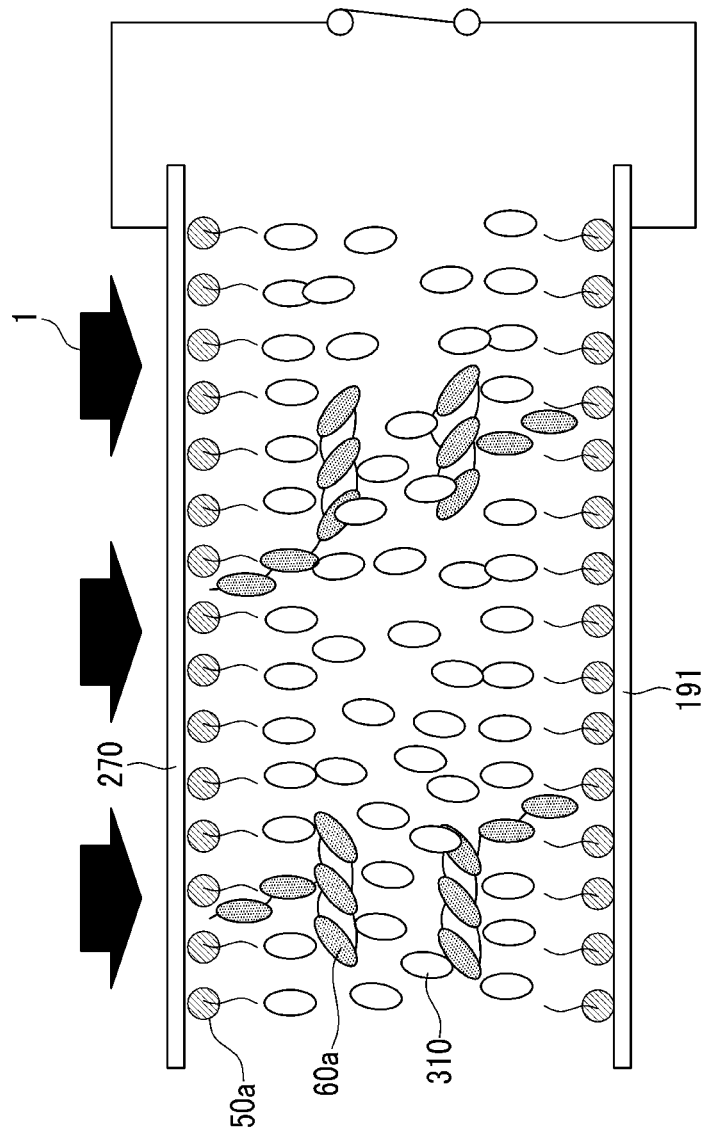

LIQUID CRYSTAL COMPOSITION, LIQUID DISPLAY, AND METHOD OF MANUFACTURING LIQUID CRYSTAL DISPLAY

INCORPORATION BY REFERENCE TO RELATED APPLICATIONS

Any and all priority claims identified in the Application Data Sheet, or any correction thereto, are hereby incorporated by reference under 37 CFR 1.57. For example, this application is a divisional of U.S. patent application Ser. No. 14/223,686 filed Mar. 24, 2014, which claims priority to and the benefit of Korean Patent Application No. 10-2013-0050280 filed on May 3, 2013 in the Korean Intellectual Property Office, the disclosure of which is incorporated in its entirety herein by reference.

BACKGROUND

Field

The described technology generally relates to a liquid crystal composition, a liquid crystal display, and a method of manufacturing the liquid crystal display.

Description of the Related Technology

A liquid crystal display is generally a device displaying an image by injecting a liquid crystal material between an upper panel in which a common electrode and the like are formed and a lower panel in which a thin film transistor, a pixel electrode, and the like are formed, applying different potentials to the pixel electrode and the common electrode to form an electric field, thus changing arrangement of liquid crystal molecules and adjusting transmittance of light therethrough.

A vertical alignment (VA) mode liquid crystal display in which the long axis of liquid crystal molecules are arranged to be vertical to upper and lower panels in a state where an electric field is not applied has a high contrast ratio and easily implements a wide viewing angle.

In preparation of a vertical alignment (VA) mode liquid crystal display a baking process needs to be performed in order to form a vertical alignment layer and an alignment agent needs to be applied on a transparent electrode corresponding to a pixel electrode or a common electrode, thus, process cost and time are increased.

Further, initial alignment of liquid crystal is important in the preparation of a vertical alignment (VA) mode liquid crystal display, and it is important to control a pretilt in order to favorably perform the initial alignment of the liquid crystal.

The above information disclosed in this Background section is only for enhancement of understanding of the background of the disclosure and therefore it may contain information that is not known to a person of ordinary skill in the art and should not be considered as an admission of prior art.

SUMMARY

Some embodiments provide a liquid crystal composition, a liquid crystal display, and a method of manufacturing the liquid crystal display, in which liquid crystal molecules can be vertically aligned without an alignment layer and a pretilt can be controlled.

Some embodiments provide a liquid crystal composition including: liquid crystals; a first alignment aid; and a second alignment aid, in which the first alignment aid and the second alignment aid are photoreactive in different wavelength regions.

In some embodiments, the first alignment aid may be photoreactive in a visible ray region, and the second alignment aid may be photoreactive in an ultraviolet ray region.

In some embodiments, the first alignment aid may be a vertical alignment component, and the second alignment aid may be a pretilt component.

In some embodiments, the first alignment aid may include at least one of the compounds represented by the following Chemical Formulas 1 to 13.

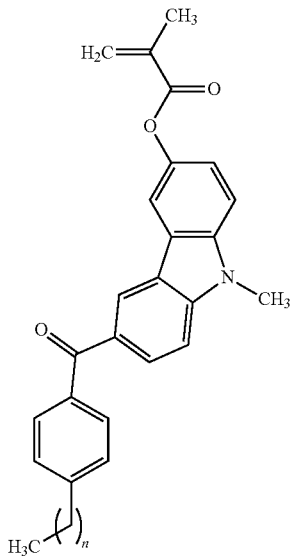

Chemical Formula 1

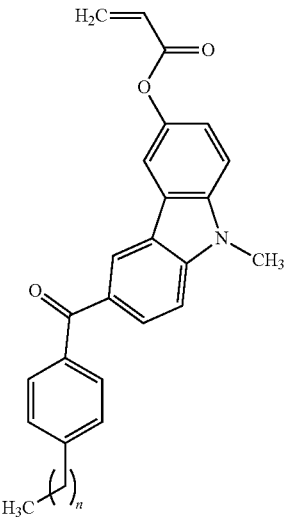

Chemical Formula 2

Chemical Formula 3
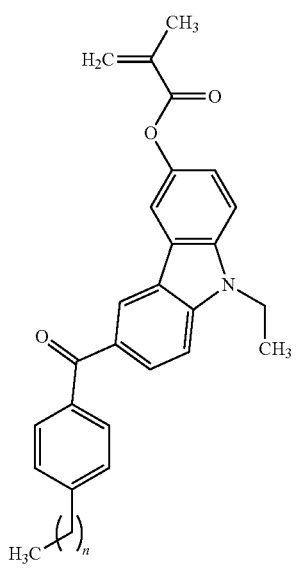
Chemical Formula 6
Chemical Formula 4
Chemical Formula 7
Chemical Formula 5
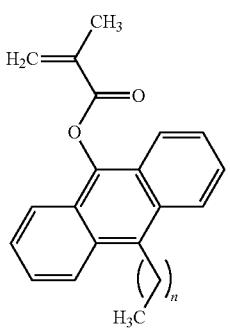
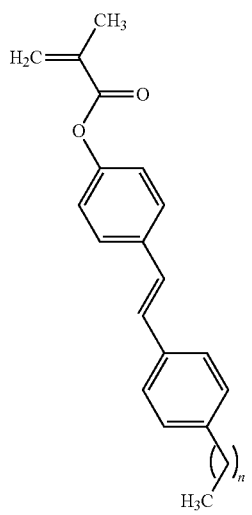
Chemical Formula 8
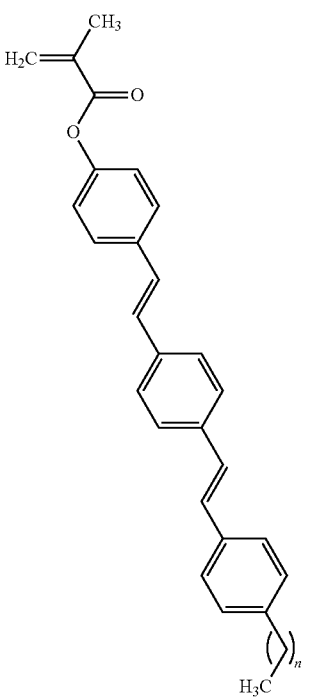

Chemical Formula 9
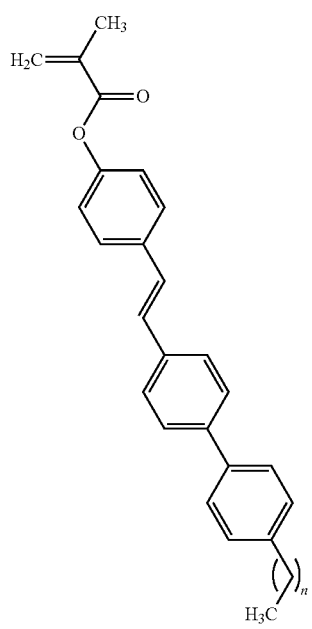
Chemical Formula 10
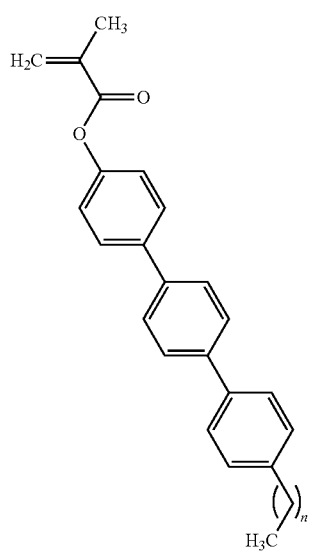
Chemical Formula 11
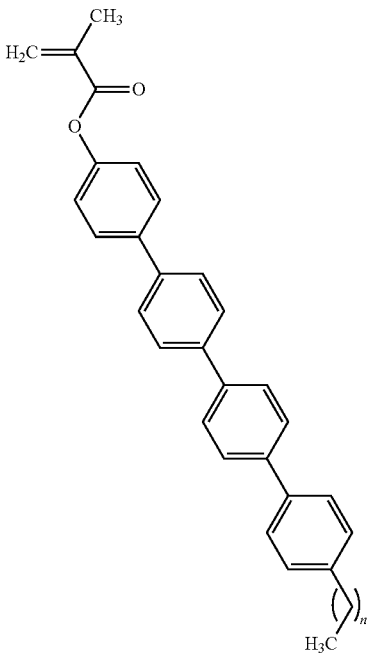
Chemical Formula 12

Chemical Formula 13

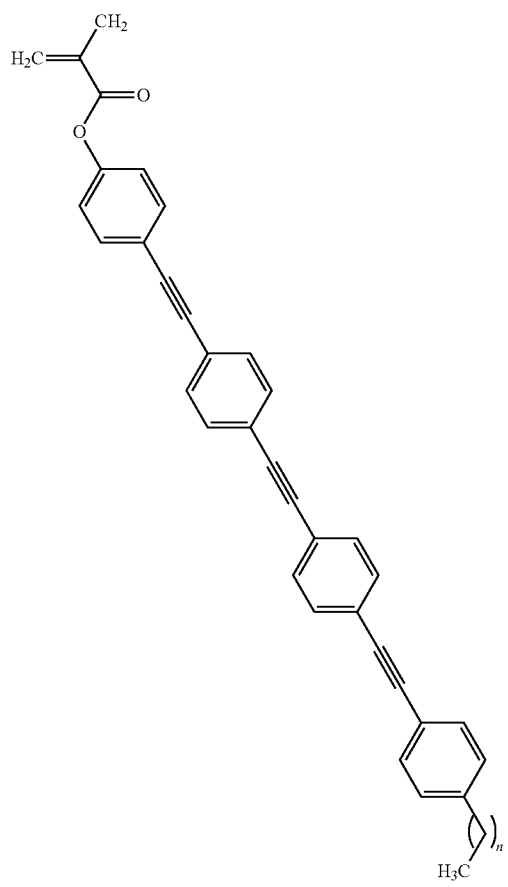

wherein, n may be 3 to 18.

The second alignment aid may include at least one of the compounds represented by the following Chemical Formulas 14 to 18.

Chemical Formula 14

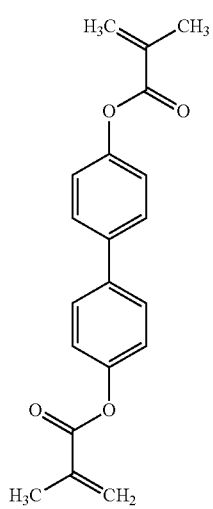

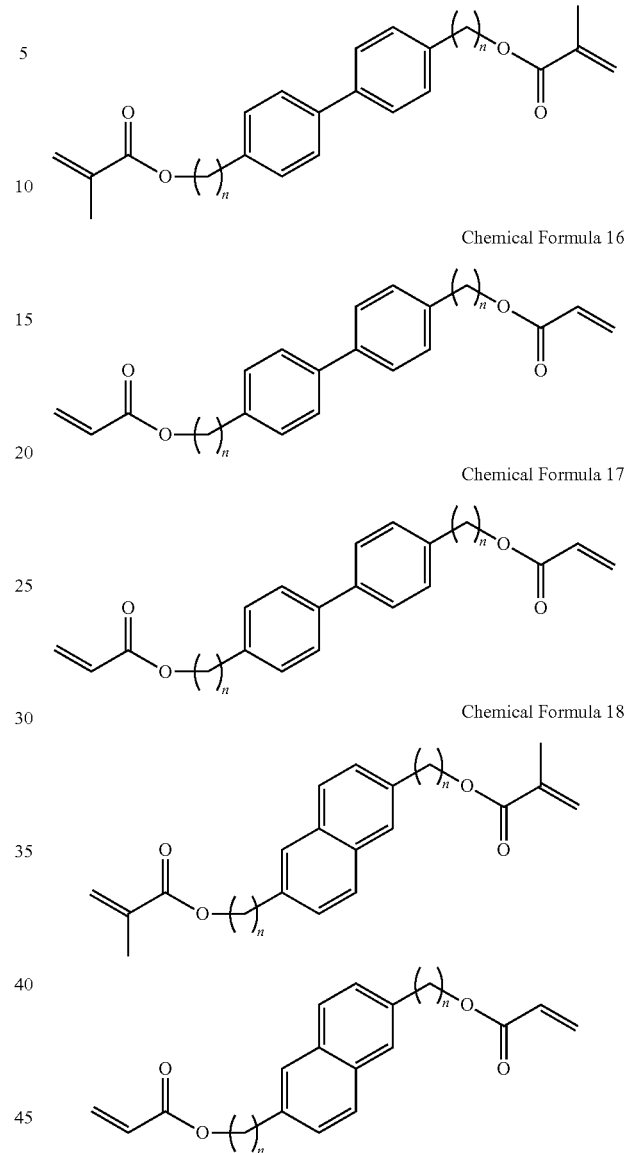

wherein, n may be 0 to 5.

In some embodiments, a content of the first alignment aid may be 0.5 wt % or more and 30 wt % or less in the liquid crystal composition.

In some embodiments, a content of the second alignment aid may be 0.1 wt % or more and 10 wt % or less in the liquid crystal composition.

Some embodiments provide a liquid crystal display including: a first substrate; a second substrate facing the first substrate; and a liquid crystal layer interposed between the first substrate and the second substrate and including liquid crystals, a first alignment polymer, and a second alignment polymer, in which the first alignment polymer is formed by radiating light on a first alignment aid photoreacted in a first wavelength region, the second alignment polymer is formed by radiating light on a second alignment aid photoreacted in a second wavelength region, and the first wavelength region and the second wavelength region are different from each other.

In some embodiments, the first wavelength region may be a visible ray region, and the second wavelength region may be an ultraviolet ray region.

In some embodiments, the first alignment polymer may be a vertical alignment component, and the second alignment polymer may be a pretilt component.

In some embodiments, the first alignment aid may include at least one of the compounds represented by the following Chemical Formulas 1 to 13.

Chemical Formula 1

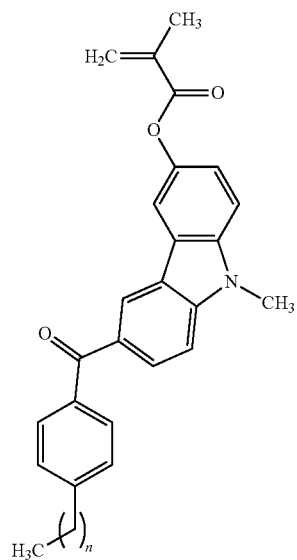

Chemical Formula 2

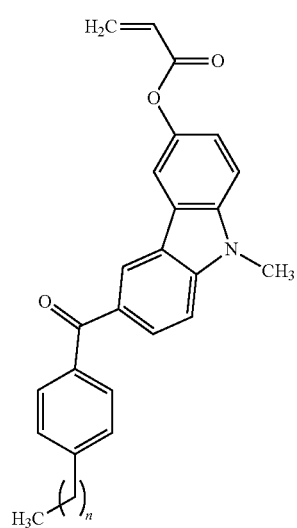

Chemical Formula 3

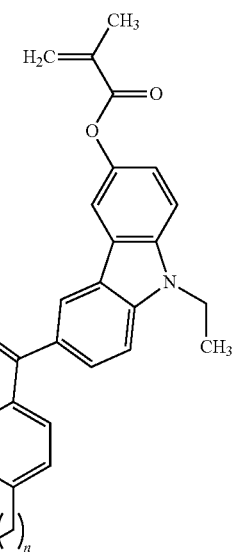

Chemical Formula 4

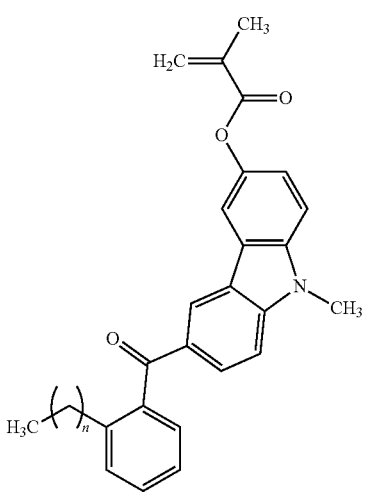

Chemical Formula 5

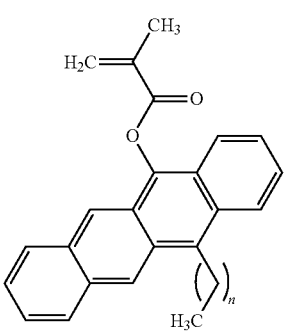

Chemical Formula 6
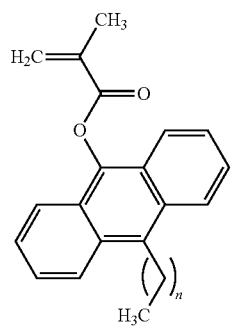
Chemical Formula 7
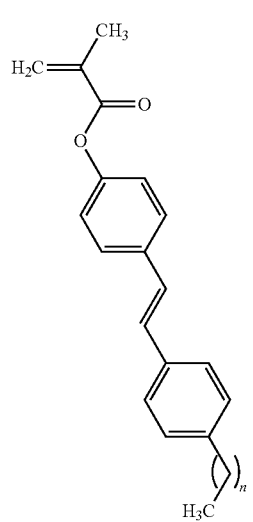
Chemical Formula 8
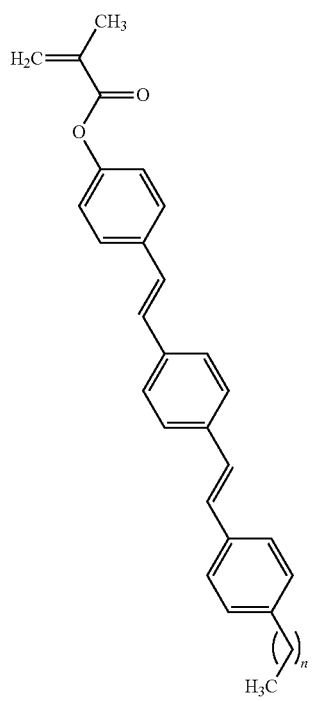
Chemical Formula 9
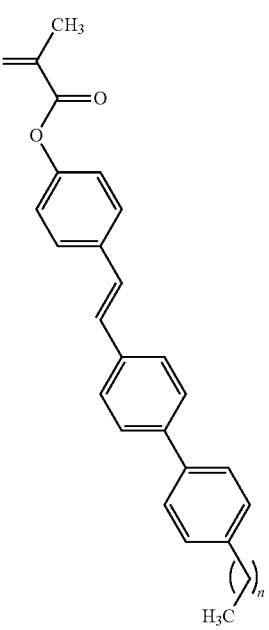
Chemical Formula 10
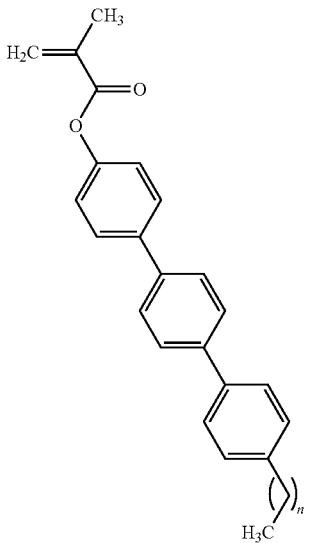

Chemical Formula 11
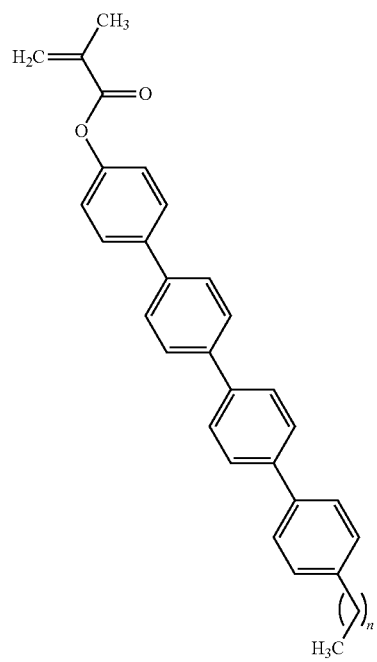
Chemical Formula 12
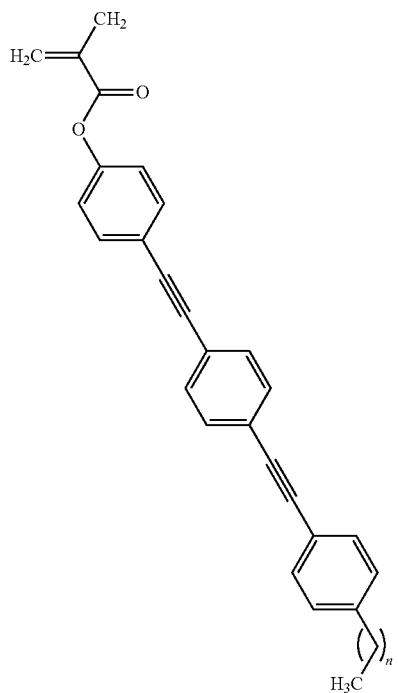
Chemical Formula 13
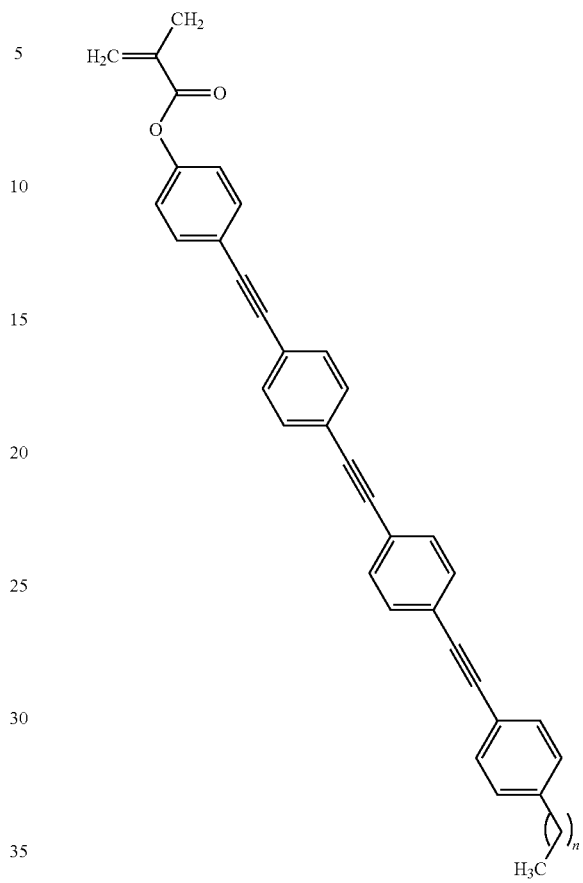
wherein, n may be 3 to 18.
In some embodiments, the second alignment aid may include at least one of the compounds represented by the following Chemical Formulas 14 to 18.
Chemical Formula 14
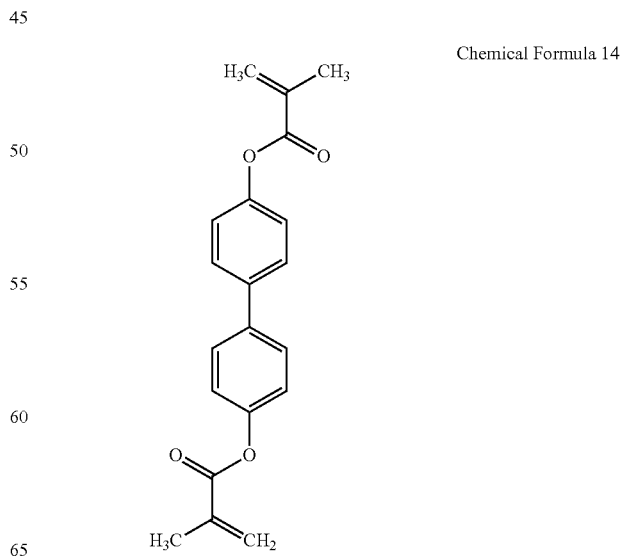

Chemical Formula 15

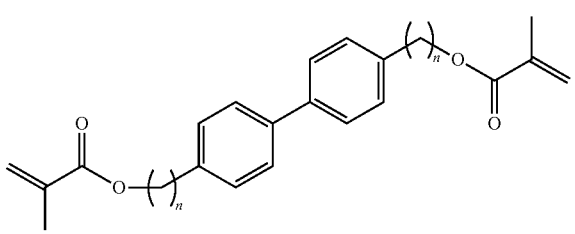

Chemical Formula 16

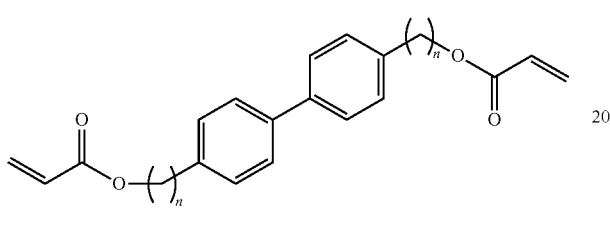

Chemical Formula 17

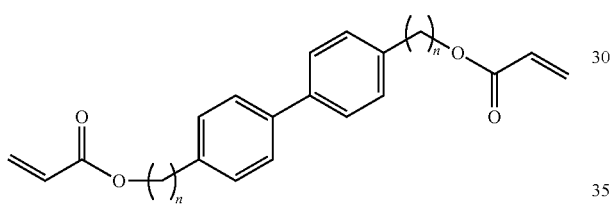

Chemical Formula 18

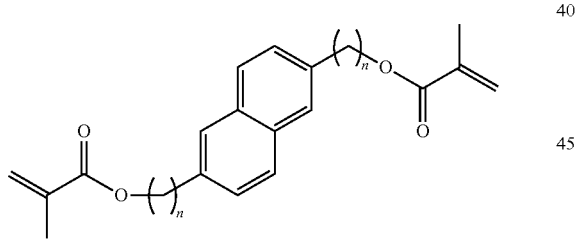

wherein, n may be 0 to 5.

In some embodiments, a content of the first alignment aid may be 0.5 wt % or more and 30 wt % or less in the liquid crystal composition including the liquid crystal, the first alignment aid, and the second alignment aid.

In some embodiments, a content of the second alignment aid may be 0.1 wt % or more and 10 wt % or less in the liquid crystal composition.

Some embodiments provide a method of manufacturing a liquid crystal display, including: forming a field generating electrode on at least one of a first substrate and a second substrate facing the first substrate; forming a liquid crystal layer including liquid crystals, a first alignment aid, and a second alignment aid between the first substrate and the second substrate; forming a first alignment polymer by radiating light of a first wavelength region between the first substrate and the second substrate; forming an electric field between the first substrate and the second substrate; and forming a second alignment polymer by radiating light of a second wavelength region between the first substrate and the second substrate, in which the first wavelength region and the second wavelength region are different from each other.

In some embodiments, the first wavelength region may be a visible ray region, and the second wavelength region may be an ultraviolet ray region.

In some embodiments, the first alignment polymer may be a vertical alignment component, and the second alignment polymer may be a pretilt component.

In some embodiments, the first alignment aid may include at least one of the compounds represented by the following Chemical Formulas 1 to 13.

Chemical Formula 1

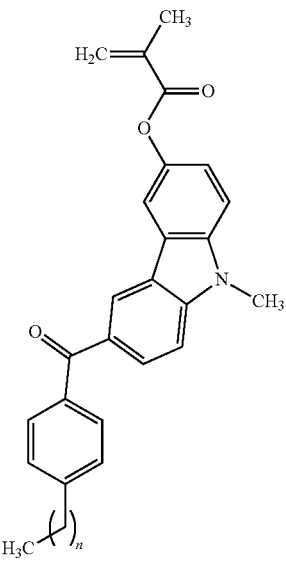

Chemical Formula 2

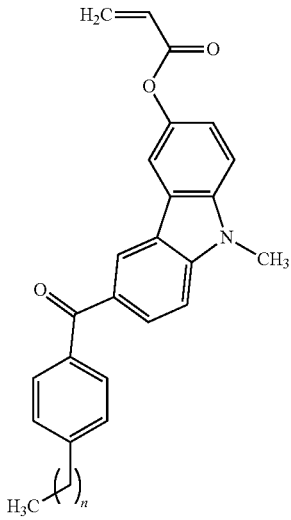

Chemical Formula 3
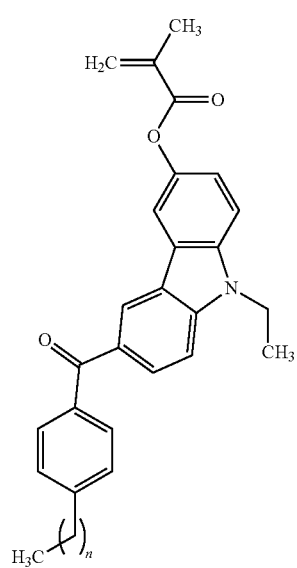
Chemical Formula 4
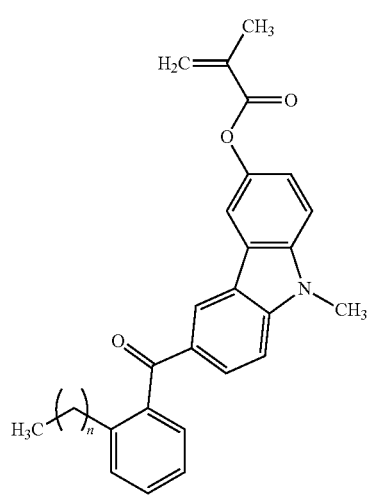
Chemical Formula 5
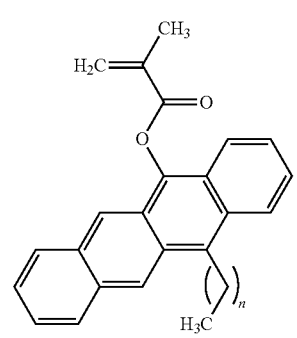
Chemical Formula 6
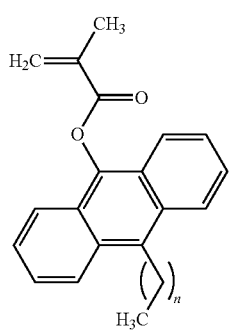
Chemical Formula 7
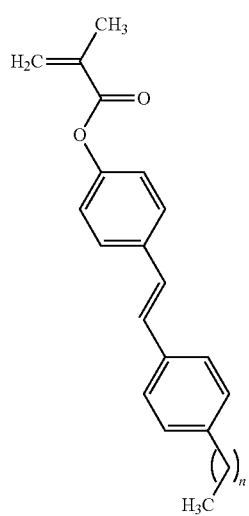
Chemical Formula 8
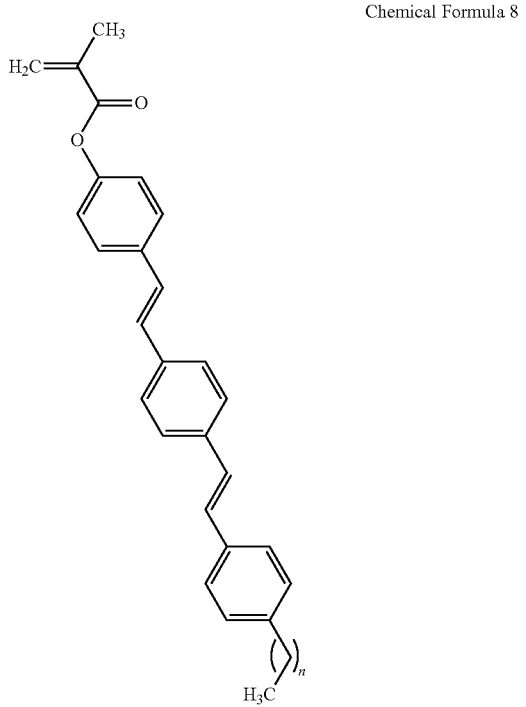

Chemical Formula 9
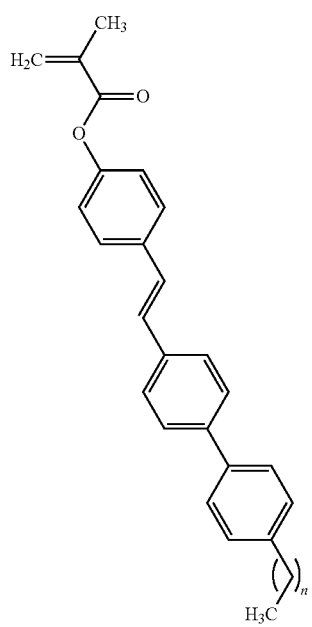
Chemical Formula 10
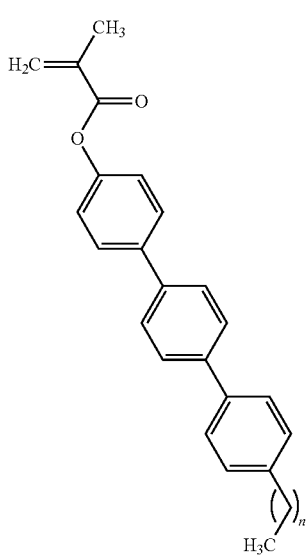
Chemical Formula 11
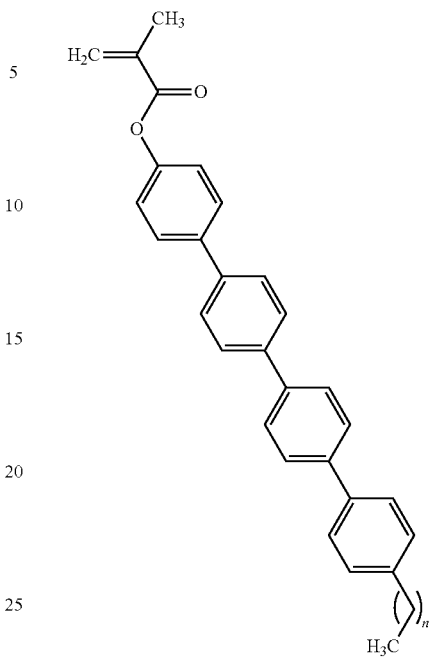
Chemical Formula 12
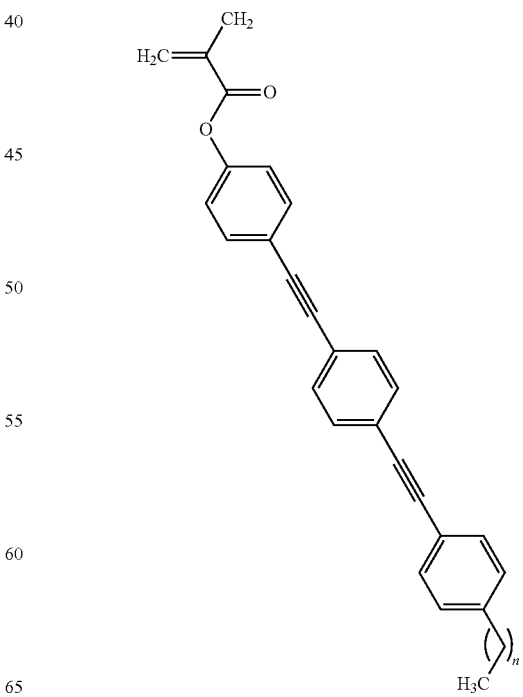

Chemical Formula 13

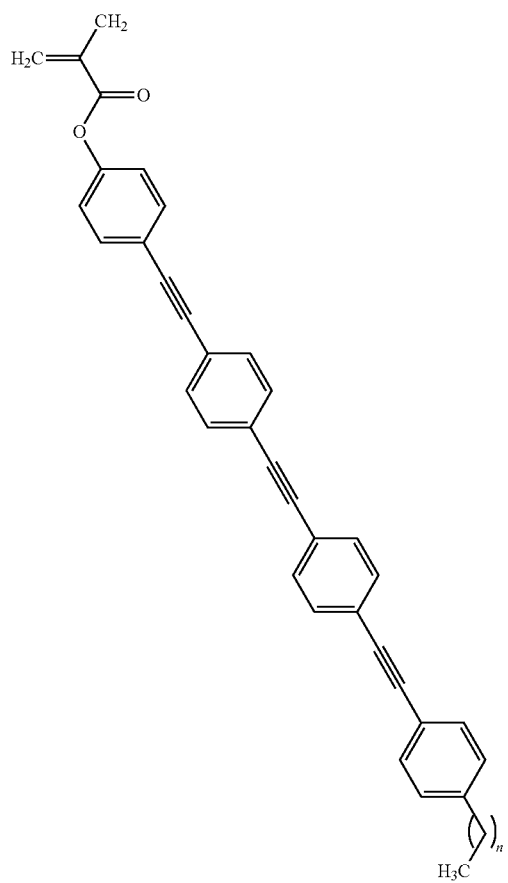

wherein, n may be 3 to 18.

In some embodiments, the second alignment aid may include at least one of the compounds represented by the following Chemical Formulas 14 to 18.

Chemical Formula 14

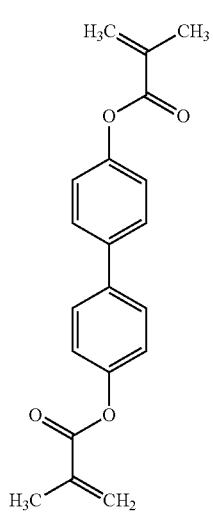

Chemical Formula 15

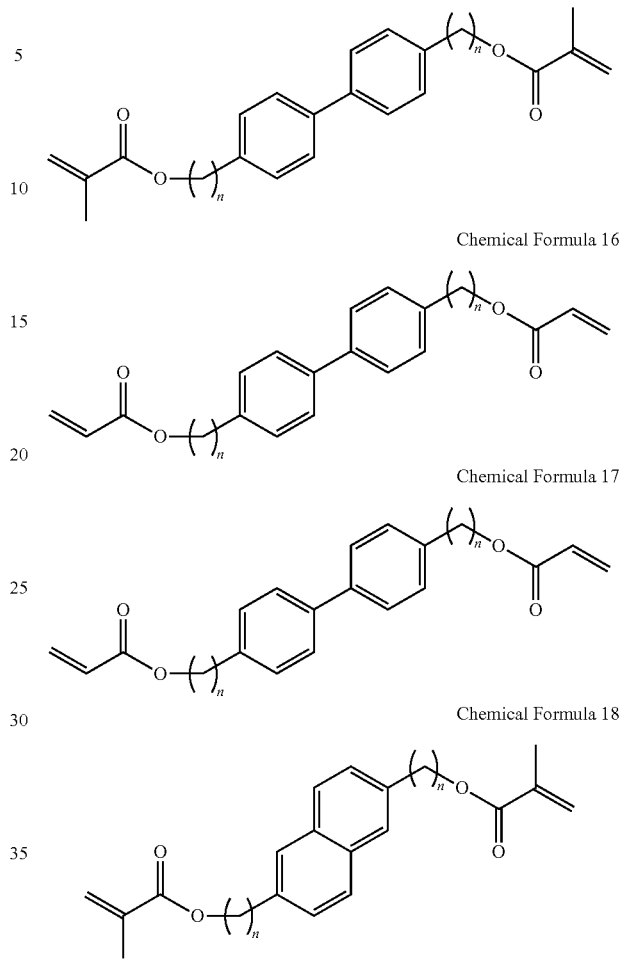

Chemical Formula 16

Chemical Formula 17

Chemical Formula 18 wherein, n may be 0 to 5.

In some embodiments, a content of the first alignment aid may be 0.5 wt % or more and 30 wt % or less in the liquid crystal composition including the liquid crystal, the first alignment aid, and the second alignment aid.

In some embodiments, a content of the second alignment aid may be 0.1 wt % or more and 10 wt % or less in the liquid crystal composition.

In some embodiments, the forming of the first alignment polymer may be performed in a state where an electric field is not formed between the first substrate and the second substrate.

In some embodiments, it is possible to improve a control ability of the liquid crystal by efficiently forming a vertical alignment component and a pretilt component by using alignment aids having different photoreactive regions. Accordingly, it is possible to obtain a liquid crystal display that can implement a high-speed response.

BRIEF DESCRIPTION OF THE DRAWINGS

FIGS. 6 to 8 are schematic diagrams illustrating a method of forming a vertical alignment and a pretilt of liquid crystal by the alignment aid according to an exemplary embodiment.

DESCRIPTION OF SYMBOLS

Figure 1:
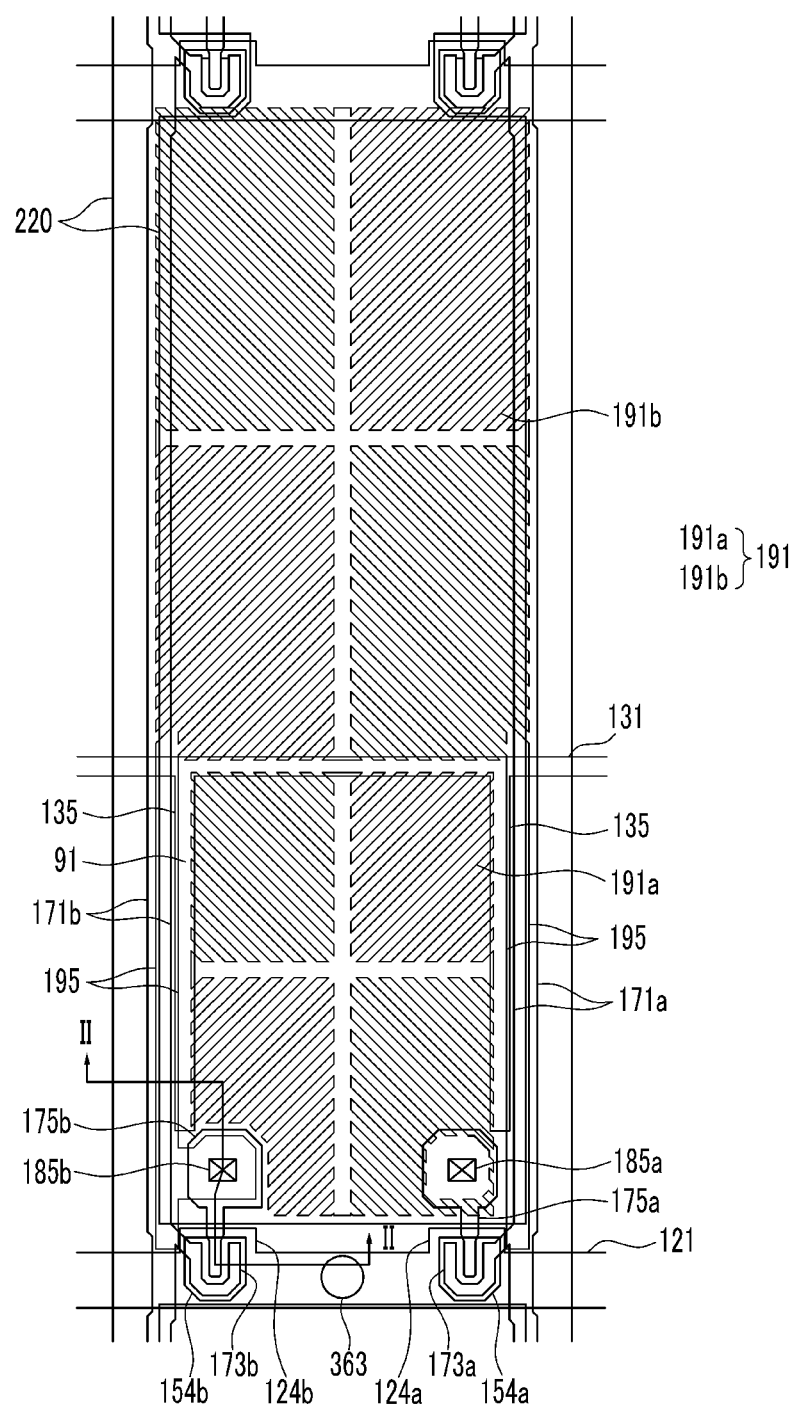
FIG. 1 is a top plan view illustrating a liquid crystal display according to an exemplary embodiment.

3: Liquid crystal layer
50: First alignment aid
50a: First alignment polymer
60: Second alignment aid
60a: Second alignment polymer
100, 200: Display panel
110, 210: Insulation substrate
121: Gate line
173: Source electrode
175: Drain electrode
191: Pixel electrode
220: Light blocking member
230: Color filter
270: Common electrode
310: Liquid crystal molecule

DETAILED DESCRIPTION

The present disclosure will be described in detail with reference to the accompanying drawings. As those skilled in the art would realize, the described embodiments may be modified in various different ways, all without departing from the spirit or scope of the present disclosure.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Some embodiments provide a liquid crystal composition including liquid crystals, a first alignment aid, and a second alignment aid. In some embodiments, the first alignment aid and the second alignment aid may be photoreacted in different wavelength regions. In some embodiments, the first alignment aid may be photoreacted in a visible ray region to be cured, and the second alignment aid may be photoreacted in an ultraviolet ray region to be cured. In some embodiments, the visible ray wavelength region may be 380 nm to 770 nm, and the ultraviolet ray wavelength region may be less than 380 nm.

In some embodiments, the first alignment aid includes at least one of the compounds represented by the following Chemical Formulas 1 to 13.

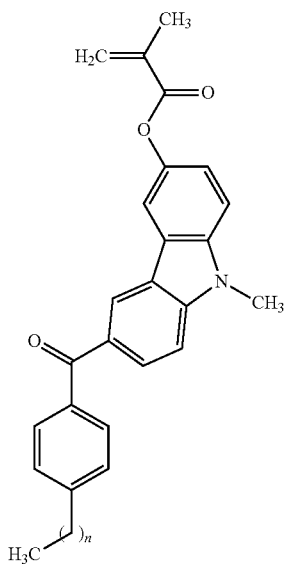

Chemical Formula 1

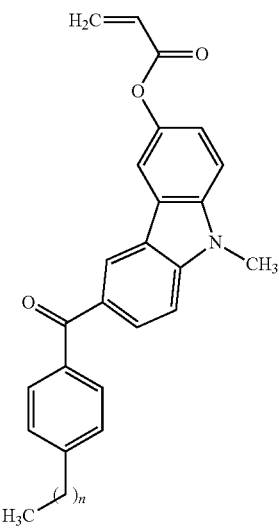

Chemical Formula 2

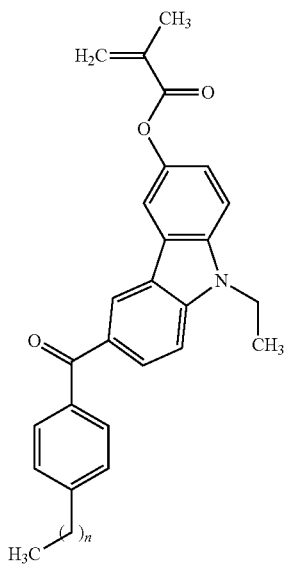

Chemical Formula 3

Chemical Formula 4
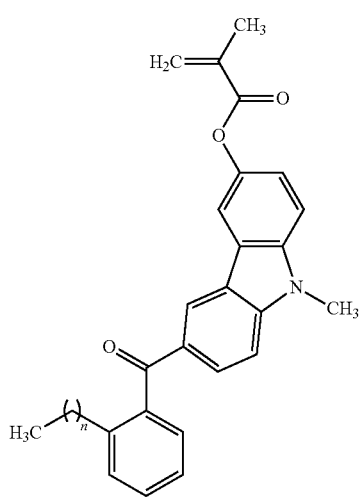
Chemical Formula 5
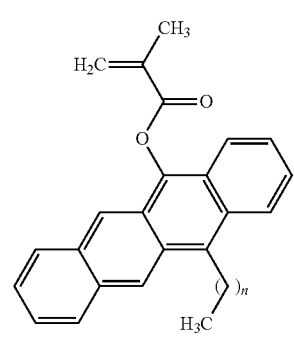
Chemical Formula 6
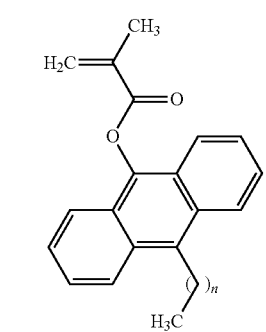
Chemical Formula 7
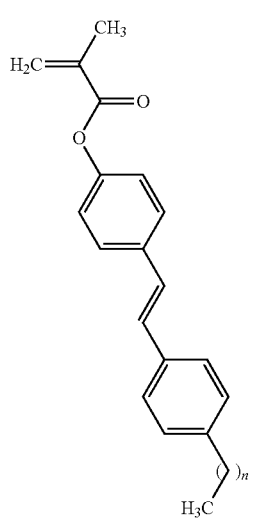
Chemical Formula 8
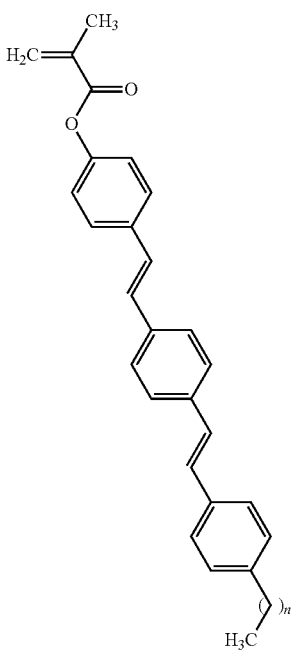
Chemical Formula 9
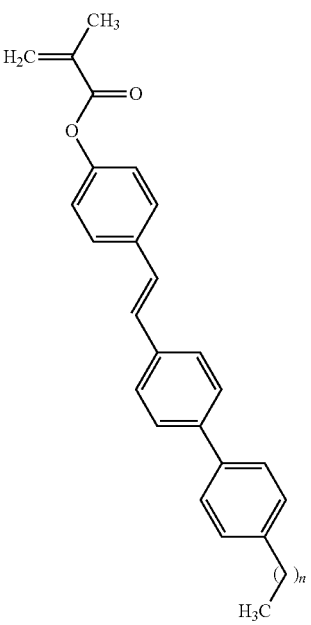

Chemical Formula 10

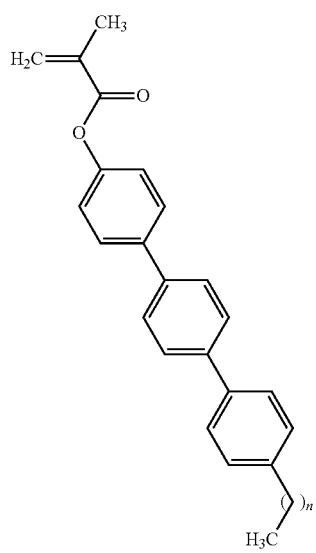

Chemical Formula 11

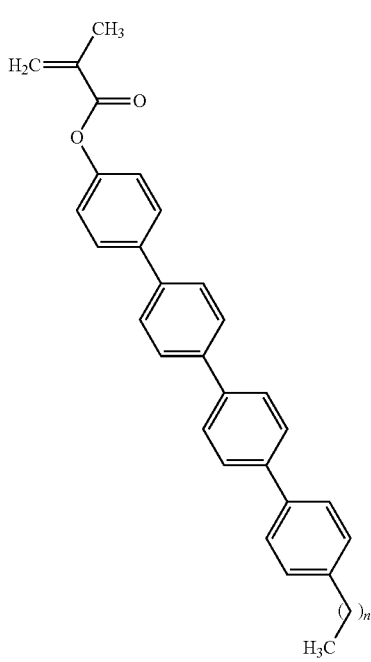

Chemical Formula 12

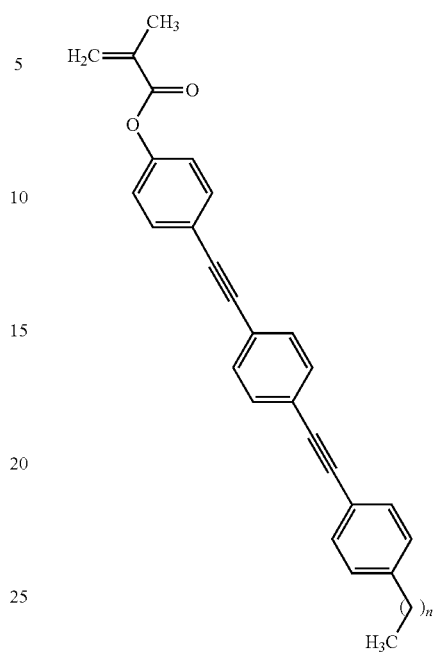

Chemical Formula 13

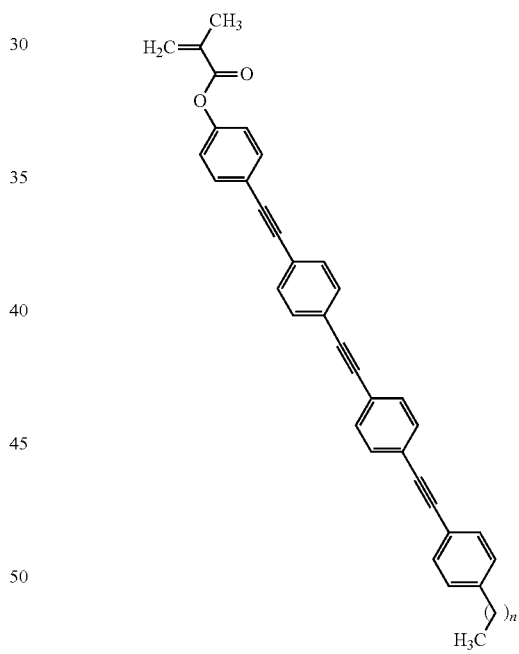

wherein, each n is independently 3 to 18.

In some embodiments, the first alignment aid may have a form in which a chromophore group that can absorb light of the visible ray region is connected to an acrylate group. Further, the first alignment aid is a vertical alignment component for vertically aligning liquid crystals by photo-curing.

In some embodiments, the first alignment aid may be included in the content of about 0.5 wt % or more and 30 wt % or less in the liquid crystal composition.

In the exemplary embodiment, the second alignment aid includes at least one of the compounds represented by the following Chemical Formulas 14 to 18.

Chemical Formula 14

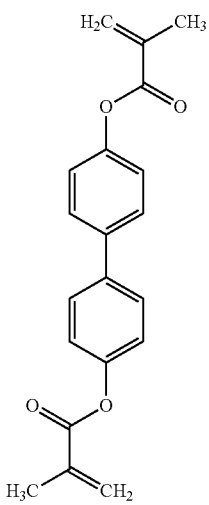

Chemical Formula 15

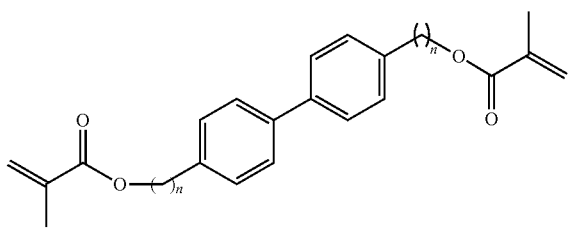

Chemical Formula 16

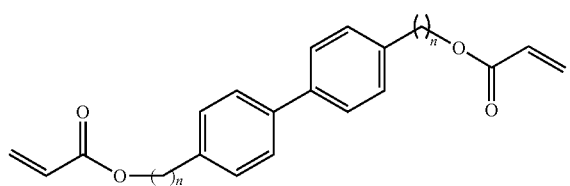

Chemical Formula 17

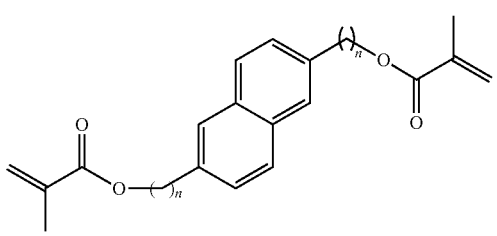

Chemical Formula 18

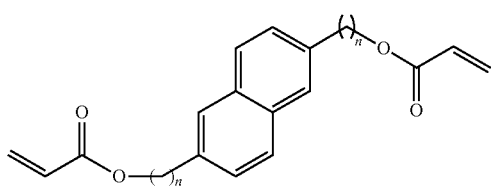

wherein, each n may be independently 0 to 5.

In some embodiments, the second alignment aid is a pretilt component for providing a pretilt of liquid crystals by photocuring. In some embodiments, the second alignment aid may be included in the content of about 0.1 wt % or more and about 10 wt % or less in the liquid crystal composition.

Hereinafter, a liquid crystal display including the liquid crystal layer formed by using the aforementioned liquid crystal composition will be described.

Figure 2:
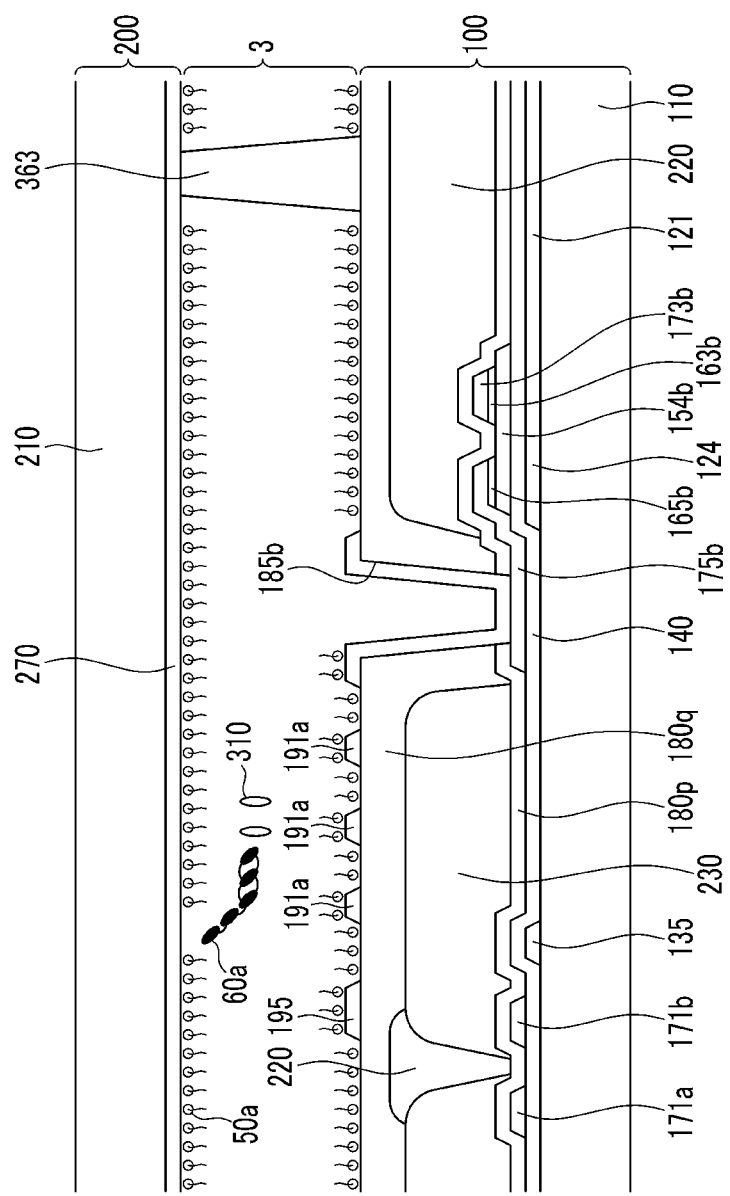
FIG. 2 is a cross-sectional view taken along cut line II-II of FIG. 1.
Figure 3:
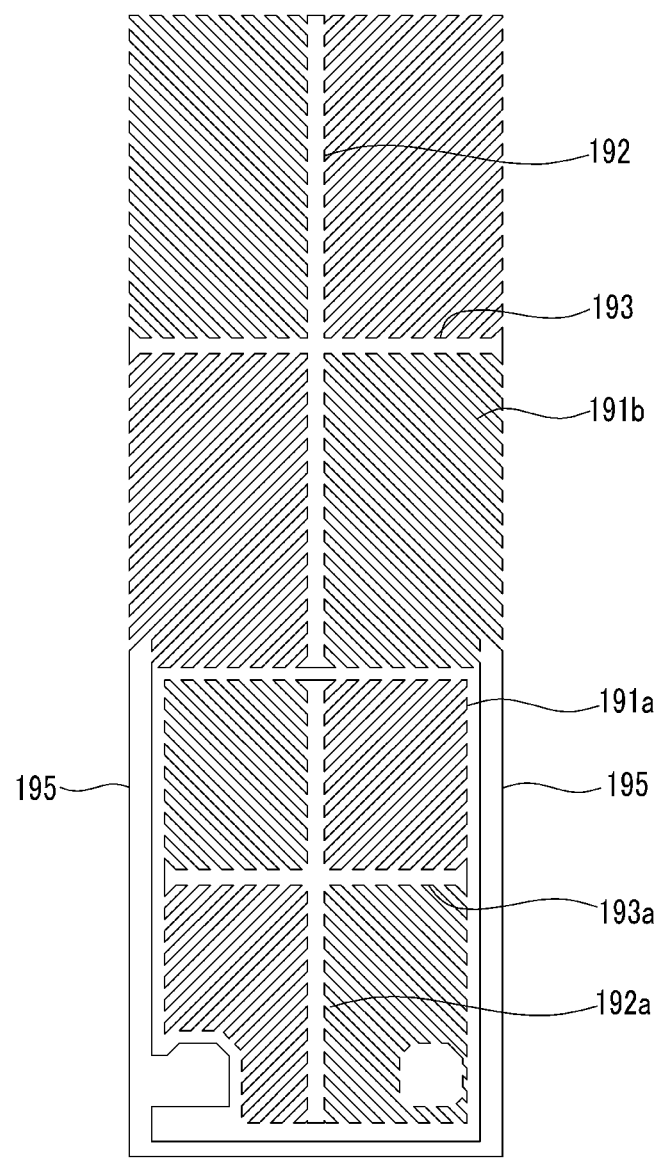
FIGS. 3 and 4 are each a top plan view illustrating a pixel electrode and a basic electrode in the exemplary embodiment of FIG. 1.
Figure 4:
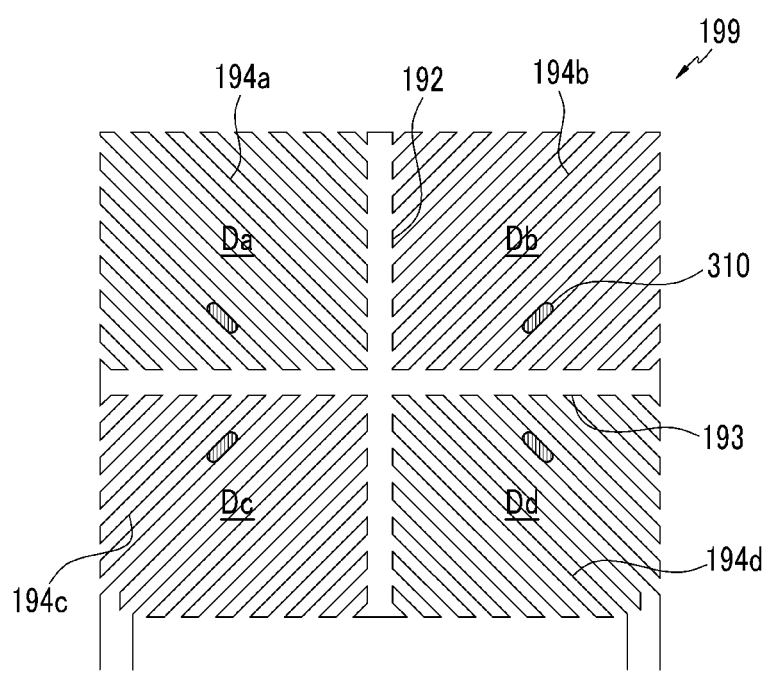

FIG. 1 is a top plan view illustrating the liquid crystal display according to the exemplary embodiment of the present invention. FIG. 2 is a cross-sectional view taken along cut line II-II of FIG. 1. FIGS. 3 and 4 are each a top plan view illustrating a pixel electrode and a basic electrode in the exemplary embodiment of FIG. 1.

Referring to FIGS. 1 and 2, the liquid crystal display according to the exemplary embodiment of the present invention includes a lower panel 100 and an upper panel 200 facing each other, and a liquid crystal layer 3 interposed between the two display panels 100 and 200. In some embodiments, the liquid crystal layer 3 includes liquid crystal molecules 310, a first alignment polymer 50a, and a second alignment polymer 60a. In some embodiments, the first alignment polymer 50a may be arranged along a surface corresponding to a boundary portion between the lower panel 100 and the liquid crystal layer 3 or a boundary portion between the upper panel 200 and the liquid crystal layer 3, and may vertically align (perpendicular to the lower panel 100 and the upper panel 200) the liquid crystal molecules 310. In some embodiments, the second alignment polymer 60a may be included in the liquid crystal layer 3 while having a pretilt by photocuring of the alignment aid.

First, the lower panel 100 will be described.

In some embodiments, a plurality of gate lines 121 and a plurality of storage electrode lines 131 and 135 are formed on an insulating substrate 110.

In some embodiments, the gate line 121 transfers a gate signal and mainly extends in a horizontal direction. In some embodiments, each gate line 121 includes a plurality of first and second gate electrodes 124a and 124b protruding upward.

In some embodiments, the storage electrode lines include stem lines 131 extending in substantially parallel to the gate lines 121 and a plurality of storage electrodes 135 extending therefrom. In some embodiments, the shape and disposal of the storage electrode lines 131 and 135 may be changed into various forms.

In some embodiments, a gate insulating layer 140 may be formed on the gate lines 121 and the storage electrode lines 131 and 135, and a plurality of semiconductors 154a and 154b made of amorphous silicon, crystalline silicon, or the like is formed on the gate insulating layer 140.

In some embodiments, a plurality pairs of ohmic contacts 163b and 165b are formed on the semiconductors 154a and 154b, and the ohmic contacts 163b and 165b may be made of a material such as n+ hydrogenated amorphous silicon in which silicide or n-type impurity is doped in a high concentration.

In some embodiments, a plurality pairs of data lines 171a and 171b and a plurality pairs of first and second drain electrodes 175a and 175b may be formed on the ohmic contacts 163b and 165b and the gate insulating layer 140.

In some embodiments, the data lines 171a and 171b transfer a data signal and mainly extend in a vertical (perpendicular) direction to cross the gate line 121 and the stem lines 131 of the storage electrode line. In some embodiments, the data lines 171a and 171b extend toward the first and second gate electrodes 124a and 124b and include first and second source electrodes 173a and 173b bent in a U-shape, and the first and second source electrodes 173a and 173b face the first and second drain electrodes 175a and 175b with the first and second gate electrodes 124a and 124b as the center thereof.

In some embodiments, each of the first and second drain electrodes 175a and 175b extends upward from an end thereof, which is partially surrounded by the first and second source electrodes 173a and 173b, and the other end thereof may have a wide area for connection to another layer.

However, the shape and disposal of the first and second drain electrodes 175a and 175b and the data lines 171a and 171b may be changed into various forms.

In some embodiments, the first and second gate electrodes 124a and 124b, the first and second source electrodes 173a and 173b, and the first and second drain electrodes 175a and 175b form first and second thin film transistors together with the first and second semiconductors 154a and 154b, and channels of the first and second thin film transistors are formed in the first and second semiconductors 154a and 154b between the first and second source electrodes 173a and 173b and the first and second drain electrodes 175a and 175b.

In some embodiments, the ohmic contacts 163b and 165b exist only between the semiconductors 154a and 154b therebeneath and the data lines 171a and 171b and the drain electrodes 175a and 175b thereon, and reduce contact resistance therebetween. In the semiconductors 154a and 154b, an exposed portion that is not covered with the data lines 171a and 171b and the drain electrodes 175a and 175b exists between the source electrodes 173a and 173b and the drain electrodes 175a and 175b.

In some embodiments, a lower passivation layer 180p made of silicon nitride or silicon oxide is formed on the data lines 171a and 171b, the drain electrodes 175a and 175b and the exposed portions of the semiconductors 154a and 154b.

In some embodiments, a color filter 230 is formed on the lower passivation layer 180p. In some embodiments, the color filter 230 may include a color filter having three colors of red, green, and blue. In some embodiments, a single layer or a dual layer of chromium and chromium oxide, or a light blocking member 220 formed of an organic material is formed on the color filter 230. In some embodiments, the light blocking member 220 may have openings arranged in a matrix form.

In some embodiments, an upper passivation layer 180q formed of a transparent organic insulating material is formed on the color filter 230 and the light blocking member 220. In some embodiments, the upper passivation layer 180q prevents the color filter 230 from being exposed and provides a flat surface. In some embodiments, a plurality of contact holes 185a and 185b through which the first and second drain electrodes 175a and 175b are exposed is formed in the upper passivation layer 180q.

In some embodiments, a plurality of pixel electrodes 191 is formed on the upper passivation layer 180q. In some embodiments, the pixel electrode 191 may be made of a transparent conductive material such as ITO or IZO, or reflective metal such as aluminum, silver, chromium, or an alloy thereof.

In some embodiments, each pixel electrode 191 includes first and second sub-pixel electrodes 191a and 191b separated from each other, and the first and second sub-pixel electrodes 191a and 191b each include one or more basic electrodes 199 illustrated in FIG. 4 or modifications thereof.

Then, the basic electrode 199 will be described in detail with reference to FIGS. 3 and 4.

As illustrated in FIG. 4, the entire shape of the basic electrode 199 is quadrangle, and the basic electrode includes a cross-shaped stem portion formed of a horizontal stem portion 193 and a vertical stem portion 192 that is vertical (perpendicular) thereto. Further, the basic electrode 199 is divided into a first sub-region Da, a second sub-region Db, a third sub-region Dc, and a fourth sub-region Dd by the horizontal stem portion 193 and the vertical stem portion 192, and each of the sub-regions Da, Db, Dc, and Dd includes a plurality of first to fourth fine branched portions 194a, 194b, 194c, and 194d.

In some embodiments, the first fine branched portion 194a extends obliquely in an upper left direction from the horizontal stem portion 193 or the vertical stem portion 192, and the second fine branched portion 194b extends obliquely in an upper right direction from the horizontal stem portion 193 or the vertical stem portion 192. Further, the third fine branched portion 194c extends in a lower left direction from the horizontal stem portion 193 or the vertical stem portion 192, and the fourth fine branched portion 194d extends obliquely in a lower right direction from the horizontal stem portion 193 or the vertical stem portion 192.

In some embodiments, the first to fourth fine branched portions 194a, 194b, 194c, and 194d form an angle of approximately 45° or 135° to the gate line 121 (shown in FIG. 1) or the horizontal stem portion 193. Further, the fine branched portions 194a, 194b, 194c, and 194d of the two adjacent sub-regions Da, Db, Dc, and Dd may be orthogonal to each other.

In some embodiments, a width of the fine branched portions 194a-194d may be 2.0 μm to 5.0 μm, and an interval between the adjacent fine branched portions 194a-194d in one sub-region Da-Dd may be 2.5 μm to 5.0 μm.

Although not illustrated in the drawings, the widths of the fine branched portions 194a, 194b, 194c, and 194d may be increased as the fine branched portions become closer to the horizontal stem portion 193 or the vertical stem portion 192.

Referring back to FIGS. 1 to 4, each of the first and second sub-pixel electrodes 191a and 191b includes one basic electrode 199. However, an area of the second sub-pixel electrode 191b occupied in the entire pixel electrode 191 may be larger than the area of the first sub-pixel electrode 191a occupied therein, and in this case, the basic electrodes 199 having different sizes are formed so that the area of the second sub-pixel electrode 191b is about 1.0 time to 2.2 times larger than the area of the first sub-pixel electrode 191a.

In some embodiments, the second sub-pixel electrode 191b includes a pair of branches 195 extending along the data line 171. In some embodiments, the branches 195 may be positioned between the first sub-pixel electrode 191a and the data lines 171a and 171b, and connected at a lower end of the first sub-pixel electrode 191a. In some embodiments, the first and second sub-pixel electrodes 191a and 191b are physically and electrically connected to the first and second drain electrodes 175a and 175b through contact holes 185a and 185b, and receive a data voltage from the first and second drain electrodes 175a and 175b.

Next, the upper panel 200 will be described.

In some embodiments, a common electrode 270 may be formed on an entire surface of a transparent insulation substrate 210 in the upper panel 200.

In some embodiments, a spacer 363 may be formed in order to maintain a space between the upper panel 200 and the lower panel 100.

Generally, in a vertical alignment (VA) mode liquid crystal display, a vertical alignment layer is applied on an internal surface of each of the lower panel 100 and the upper panel 200, but in the exemplary embodiment, the alignment layer is not formed.

In some embodiments, a polarizer (not illustrated) may be provided on external surfaces of the lower panel 100 and the upper panel 200.

In some embodiments, a liquid crystal layer 3 is interposed between the lower panel 100 and the upper panel 200. In some embodiments, the liquid crystal layer 3 includes a plurality of liquid crystal molecules 310, a first alignment polymer 50a formed by photopolymerizing a first alignment aid, and a second alignment polymer 60a formed by photopolymerizing a second alignment aid.

In some embodiments, the liquid crystal molecules 310 have negative dielectric anisotropy, and are aligned so that the long axis thereof are almost vertical (perpendicular) to surfaces of the two display panels 100 and 200 in a state where there is no electric field. In some embodiments, since the first alignment polymer 50a formed by photopolymerizing the first alignment aid having a vertical alignment component is included in the liquid crystal layer 3, even though there is no alignment layer, the liquid crystal molecules 310 may be vertically aligned.

In some embodiments, the first alignment aid and the second alignment aid may be photoreactive in different wavelength regions. In some embodiments, the first alignment aid may be photoreactive in a visible wavelength region to be cured, and the second alignment aid may be photoreactive in an ultraviolet wavelength region to be cured. In some embodiments, the visible wavelength region may be 380 nm to 770 nm, and the ultraviolet wavelength region may be less than 380 nm.

In some embodiments, the first alignment aid includes at least one of the compounds represented by the following Chemical Formulas 1 to 13.

Chemical Formula 1

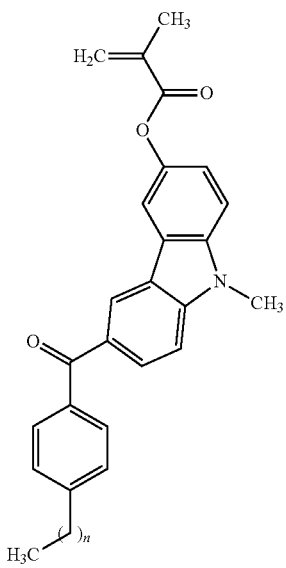

Chemical Formula 2

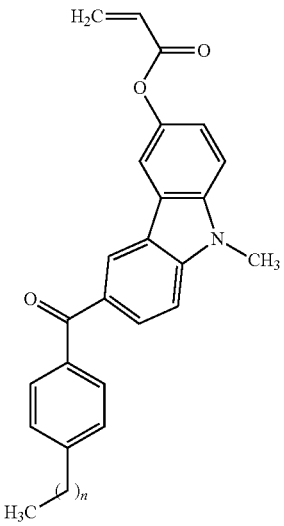

Chemical Formula 3

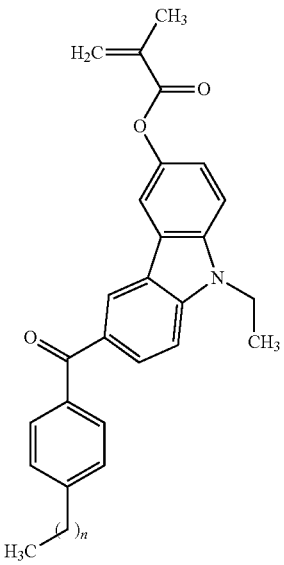

Chemical Formula 4

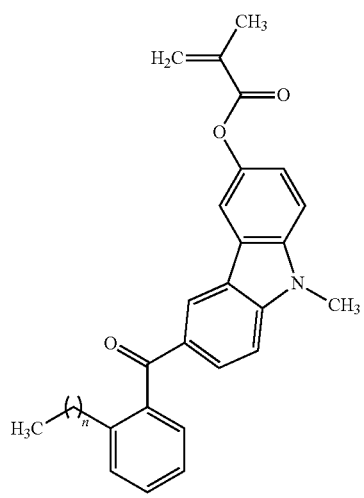

Chemical Formula 5
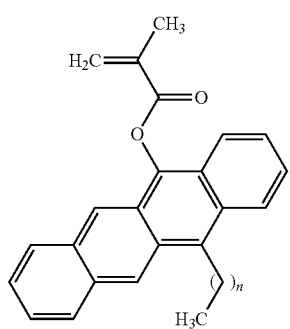
Chemical Formula 6
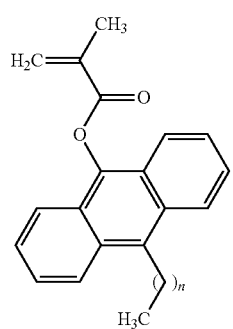
Chemical Formula 7
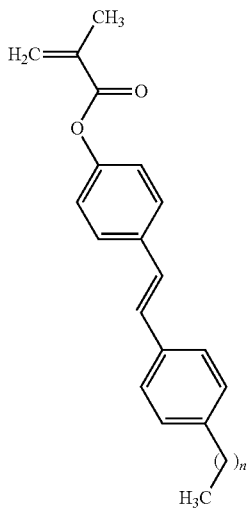
Chemical Formula 8
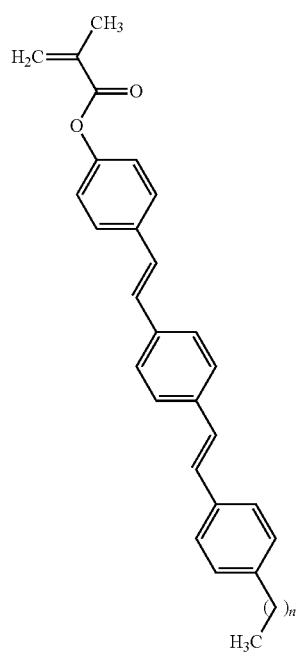
Chemical Formula 9
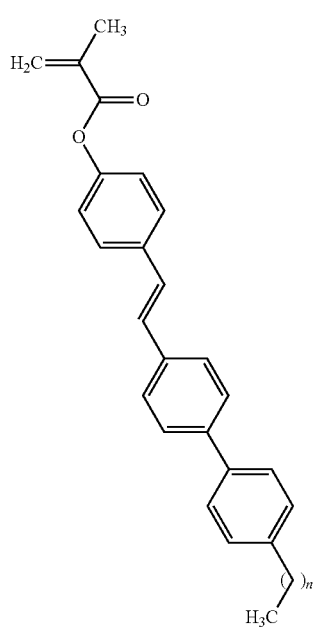

Chemical Formula 10

Chemical Formula 11

Chemical Formula 12

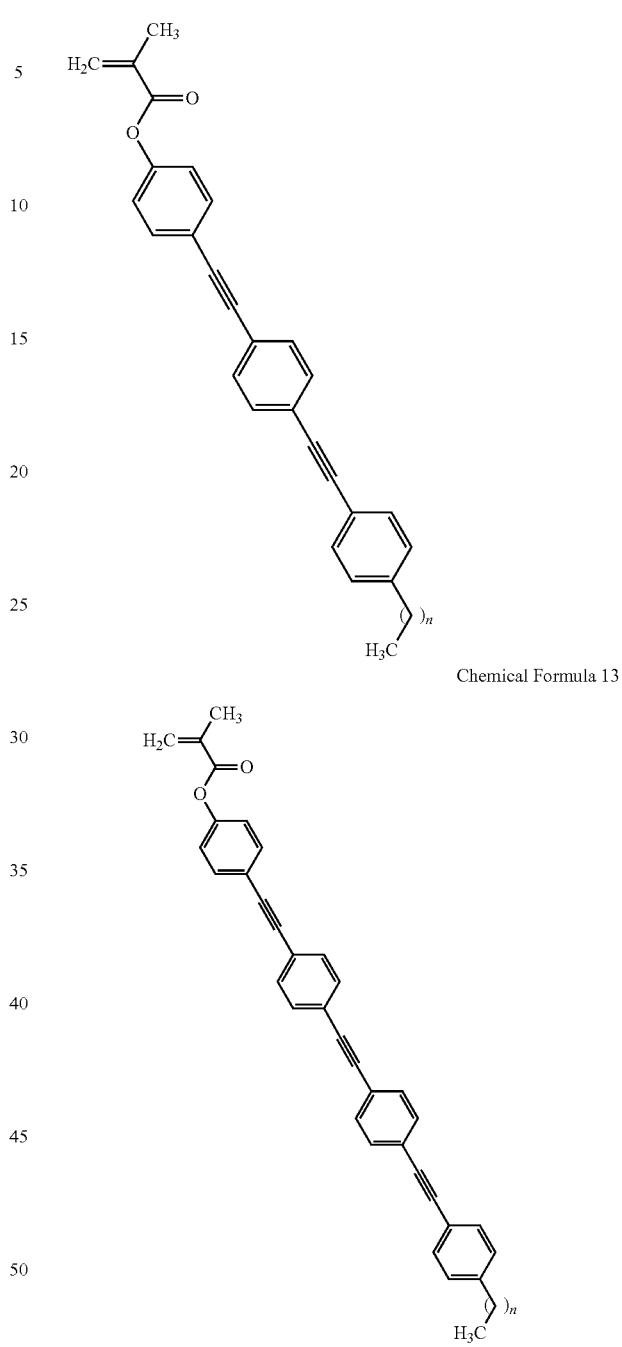

Chemical Formula 13 wherein, each n is independently 3 to 18.

In some embodiments, the first alignment aid absorbs light of the visible wavelength region during curing, thus forming the first alignment polymer 50a. In some embodiments, the first alignment polymer 50a may be arranged along a surface corresponding to a boundary portion between the lower panel 100 and the liquid crystal layer 3 or a boundary portion between the upper panel 200 and the liquid crystal layer 3 to play substantially the same role as the vertical alignment layer. In some embodiments, the first alignment polymer 50a may be the vertical alignment component vertically aligning the liquid crystal molecules 310.

In some embodiments, the first alignment aid may be included in the content of about 0.5 wt % or more and 30 wt % or less in the liquid crystal composition formed of the liquid crystal molecules 310, the first alignment aid, and the second alignment aid.

In some embodiments, the second alignment aid includes at least one of the compounds represented by the following Chemical Formulas 14 to 18.

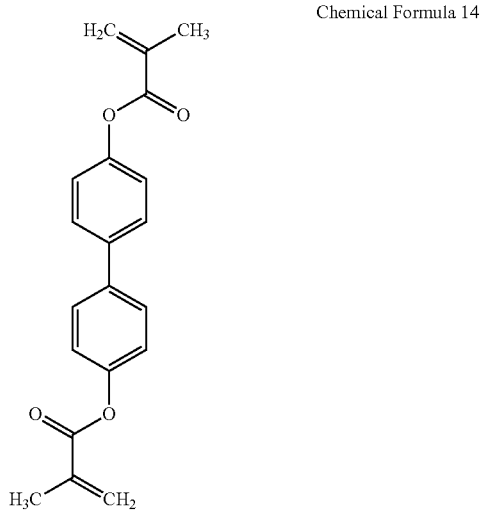

Chemical Formula 14

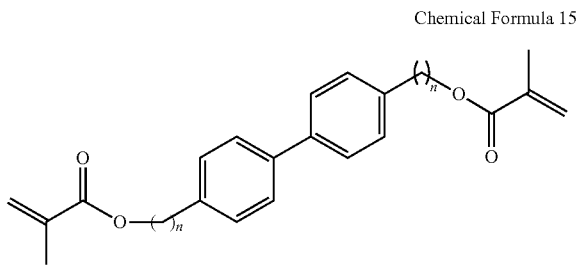

Chemical Formula 15

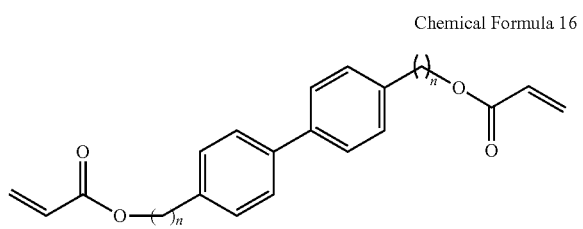

Chemical Formula 16

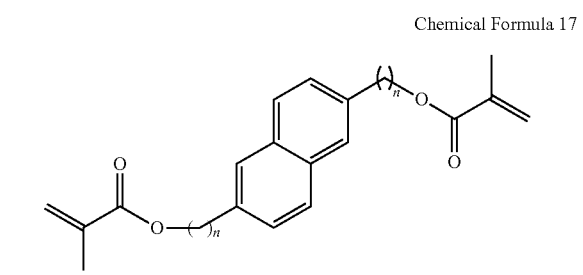

Chemical Formula 17

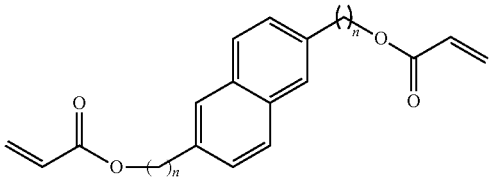

Chemical Formula 18 wherein, each n may be independently 0 to 5.

In some embodiments, the second alignment polymer 60*a* having a pretilt is formed by photocuring the second alignment aid. Accordingly, the second alignment polymer 60*a* is a pretilt component controlling the pretilt, which is an initial alignment direction of the liquid crystal molecules 310, to increase a response speed when the liquid crystal display according to the exemplary embodiment is driven. In some embodiments, the second alignment aid may be included in the content of about 0.1 wt % or more and about 10 wt % or less in the liquid crystal composition.

In some embodiments, the, the liquid crystal molecules 310 respond an electric field formed between the pixel electrode 191 and the common electrode 270, such that a direction of the long axes thereof is changed into a direction that is vertical (perpendicular) to a direction of the electric field if a voltage is applied to the pixel electrode 191 and the common electrode 270. In some embodiments, a degree of change in polarization of light incident to the liquid crystal layer 3 varies according to a degree of inclination of the liquid crystal molecules 310, the change in polarization is represented as a change in transmittance by a polarizer, and the liquid crystal display displays an image therethrough.

In some embodiments, the direction where the liquid crystal molecules 310 are inclined may be determined by the fine branches 194*a*, 194*b*, 194*c*, and 194*d* of the pixel electrode 191, and the liquid crystal 310 may be inclined in a direction that is parallel to a length direction of the fine branches 194*a*, 194*b*, 194*c*, and 194*d*. Since one pixel electrode 191 includes four sub-regions Da, Db, Dc, and Dd where length directions of the fine branches 194*a*, 194*b*, 194*c*, and 194*d* are different from each other, the directions where the liquid crystal 310 is inclined are approximately four directions, and four domains where alignment directions of the liquid crystal 310 are different from each other are formed in the liquid crystal layer 3. As described above, a viewing angle of the liquid crystal display may be improved by diversifying the inclination direction of liquid crystal.

In the liquid crystal display according to the aforementioned embodiments, a description of the thin film transistor structure and the pixel electrode structure is an example of a visible structure for improving lateral visibility, and a design of the thin film transistor structure and the pixel electrode structure is not limited to the content described in the exemplary embodiment but can be modified.

Figure 5:
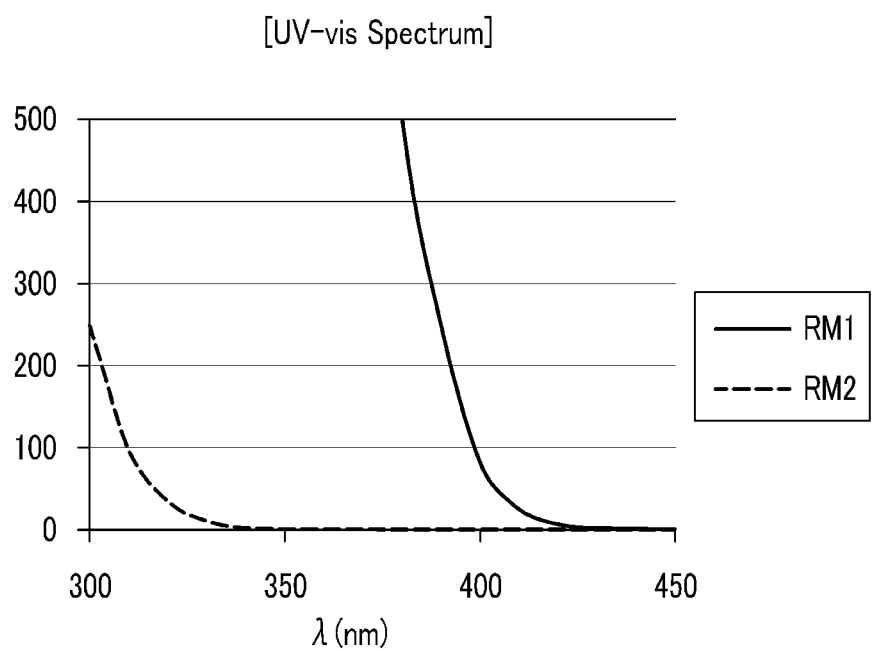
FIG. 5 is a graph illustrating ultraviolet ray and visible ray spectra to an alignment aid according to an exemplary embodiment.

FIG. 5 is a graph illustrating ultraviolet ray and visible ray spectra to an alignment aid according to an exemplary embodiment.

In FIG. 5, ultraviolet ray (UV) and visible ray (Vis) spectra were measured by using a first alignment aid RM1 represented by Chemical Formula 1 and a second alignment aid RM2 represented by Chemical Formula 5 as Experimental Examples.

Referring to FIG. 5, it can be determined that the first alignment aid RM1 absorbs light of the visible wavelength region of about 380 nm or more and the second alignment aid RM2 absorbs light of the ultraviolet wavelength region of about 350 nm or less. In some embodiments, a material of the first alignment aid may be extended to a material absorbing light of the visible wavelength region, and a material of the second alignment aid may be extended to a material absorbing light of the ultraviolet wavelength region. Accordingly, in some embodiments, the visible ray wavelength region may be 380 nm to 770 nm, and the ultraviolet ray wavelength region may be less than 380 nm.

Figure 6:
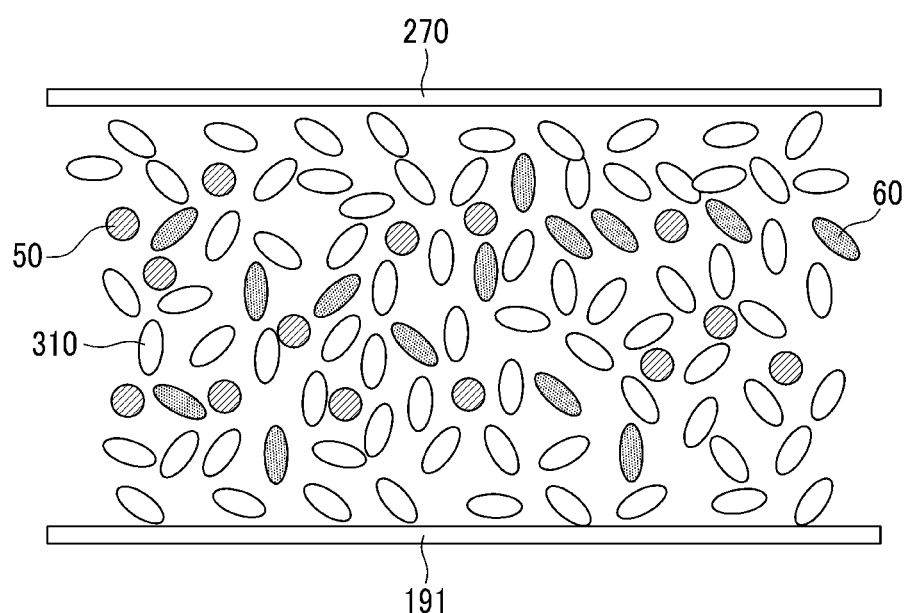

FIGS. 6 to 8 are schematic diagrams illustrating a method of forming a vertical alignment and a pretilt of liquid crystal by the alignment aid according to embodiments of the present disclosure.

This will be described with reference to FIGS. 6 to 8 together with FIGS. 1 to 4.

Referring to FIGS. 1 to 4, first, a thin film transistor array panel 100 and a common electrode panel 200 are each manufactured.

In some embodiments, the lower panel 100 may be manufactured by the following method.

In some embodiments, a plurality of thin films is laminated and patterned on a substrate 110 to sequentially form gate lines 121 including gate electrodes 124a and 124b, a gate insulating layer 140, semiconductors 154a and 154b, data lines 171a and 171b including source electrodes 173a and 173b, drain electrodes 175a and 175b, and a lower passivation layer 180p.

Subsequently, a color filter 230 may be formed on the lower passivation layer 180p, and a light blocking member 220 may be formed thereon. In some embodiments, an upper passivation layer 180q may be formed on the color filter 230 and the light blocking member 220.

Conductive layers such as ITO or IZO may be laminated on the upper passivation layer 180q and patterned to, as illustrated in FIGS. 3 and 4, form a pixel electrode 191 having a vertical portion 192, a horizontal portion 193, and a plurality of fine branches 194a, 194b, 194c, and 194d extending therefrom.

In some embodiments, the upper panel 200 may be manufactured by the following method.

In some embodiments, a common electrode 270 may be formed on the substrate 210.

Next, referring to FIG. 6, a liquid crystal layer 3 is formed by assembling the lower panel 100 and the upper panel 200 manufactured by the aforementioned method, and injecting a mixture of the liquid crystal molecules 310, a first alignment aid 50, and a second alignment aid 60 thereinto. In some embodiments, the liquid crystal layer 3 may be formed by a manner in which the mixture of the liquid crystal molecules 310, the first alignment aid 50, and the second alignment aid 60 is dripped on the lower panel 100 or the upper panel 200.

Referring to FIG. 7, electromagnetic radiation 1 is radiated in a state where a voltage is not applied to the pixel electrode 191 and the common electrode 270. In this case, the electromagnetic radiation 1 corresponds to light of the visible wavelength region having the wavelength band of about 380 nm or more and 770 nm or less. Herein, the first alignment aid 50 may be photocured to form a first alignment polymer 50a arranged along a surface corresponding to a boundary portion between the pixel electrode 191 and the liquid crystal layer 3 or a boundary portion between the common electrode 270 and the liquid crystal layer 3, and the first alignment polymer 50a forms a network for vertically aligning the liquid crystal molecules 310. In some embodiments, the liquid crystal molecules 310 may be aligned so that the long axis thereof are almost vertical (perpendicular) to surfaces of the two display panels 100 and 200. In this case, it is preferable that the second alignment aid 60 be not photoreacted.

Referring to FIG. 8, a voltage is applied to the pixel electrode 191 and the common electrode 270. In some embodiments, the liquid crystal molecules 310 and the second alignment aid 60 are inclined in a direction that is parallel to a length direction of fine branches 194a-194d of the pixel electrode 191 by applying the voltage. In some embodiments, the liquid crystal molecules 310 positioned around the pixel electrode 191 and the common electrode 270 maintain vertical alignment by interaction with the first alignment polymer 50a.

As described above, the electromagnetic radiation 1 may be radiated in a state where the voltage is applied between the pixel electrode 191 and the common electrode 270. In this case, the electromagnetic radiation 1 corresponds to an ultraviolet wavelength region having a wavelength band of less than about 380 nm. In some embodiments, the electromagnetic radiation 1 of the ultraviolet wavelength region polymerizes the second alignment aid 60 to form a second alignment polymer 60a. In some embodiments, the second alignment polymer 60a may control a pretilt of the liquid crystal molecules 310.

Hereinafter, preferable contents of the first alignment aid and the second alignment aid, which may be included in the liquid crystal composition according to the exemplary embodiment of the present disclosure, will be described through Experimental Examples.

Referring to the following Table 1, the response speed and the black characteristic (black light leakage) were tested while changing the content of the first alignment aid to 0.5 wt %, 1.0 wt %, 15 wt %, and 30 wt % in a state where the content of the second alignment aid was maintained at 1.0 wt % as Experimental Example 1.

The response speed and the black characteristic (black light leakage) were tested while changing the content of the second alignment aid to 0.1 wt %, 1.0 wt %, and 10 wt % in a state where the content of the first alignment aid was maintained at 15 wt % as Experimental Example 2.

The results confirm that it is preferable that the content of the first alignment aid be 0.5 wt % or more and 30 wt % or less and the content of the second alignment aid be 0.1 wt % or more and 10 wt % or less in the liquid crystal composition. In the case of the first alignment aid, in the case where the content thereof is less than 0.5 wt %, a possibility of occurrence of light leakage is increased, and in the case where the content thereof is more than 30 wt %, the response speed deteriorates. In the case of the second alignment aid, in the case where the content thereof is less than 0.1 wt %, the response speed deteriorates, and in the case where the content thereof is more than 10 wt %, a possibility of occurrence of light leakage is increased.

TABLE 1

|  | First alignment aid | Second alignment aid | Response speed | Black characteristic |
|---|---|---|---|---|
| Experimental Example 1 | 0.5 wt % | 1.0 wt % | 12.1 ms | Weakly occur |
|  | 1.0 wt % | 1.0 wt % | 13.2 ms | OK |
|  | 15 wt % | 1.0 wt % | 14.5 ms | OK |
|  | 30 wt % | 1.0 wt % | 17.2 ms | OK |
| Experimental Example 2 | 15 wt % | 0.1 wt % | 19.1 ms | OK |
|  | 15 wt % | 1.0 wt % | 14.5 ms | OK |
|  | 15 wt % | 10 wt % | 10.1 ms | Weakly occur |

As shown in the embodiments disclosed herein, the material corresponding to the vertical alignment component and the material corresponding to the pretilt component are substantially independently photoreactive. Accordingly, when a vertical alignment component in the related art is photoreacted without an electric field, even the material corresponding to the pretilt component is partially photoreacted, and thus it is possible to prevent a phenomenon in which the pretilt component insufficiently photoreacted with the electric field.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
   liquid crystals;
   a first alignment aid; and
   a second alignment aid,
   wherein the first alignment aid and the second alignment aid are photoreactive in different wavelength regions,
   wherein the first alignment aid is a vertical alignment component, and the second alignment aid is a pretilt component, and
   wherein the first alignment aid includes at least one of the compounds represented by the following Chemical Formulas 1 to 9 and 11 to 13:

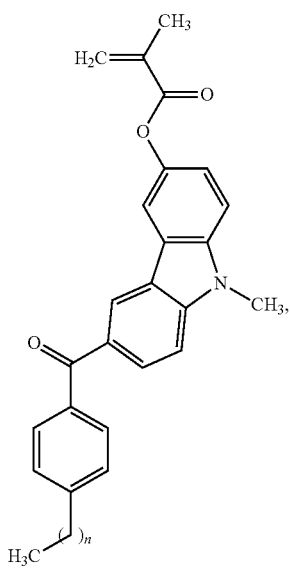

Chemical Formula 1

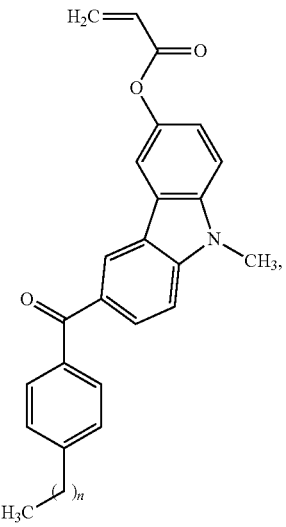

Chemical Formula 2

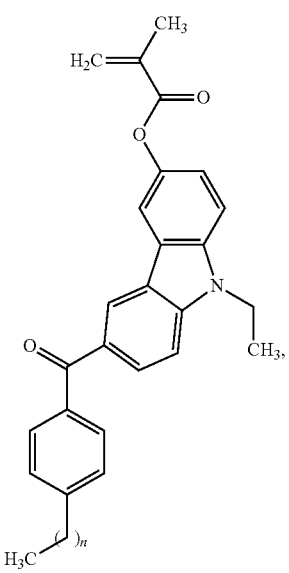

Chemical Formula 3

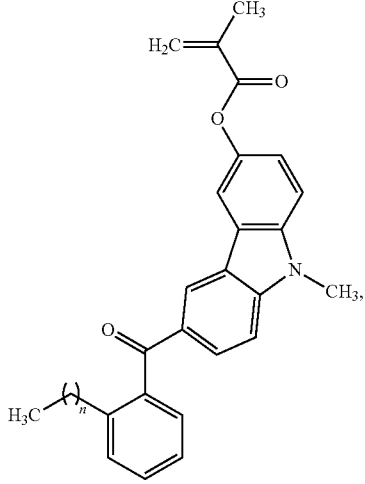

Chemical Formula 4

Chemical Formula 5
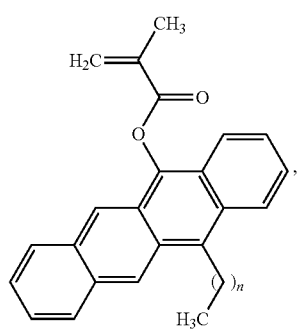
Chemical Formula 6
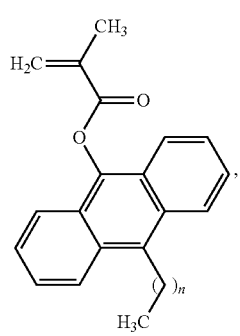
Chemical Formula 7
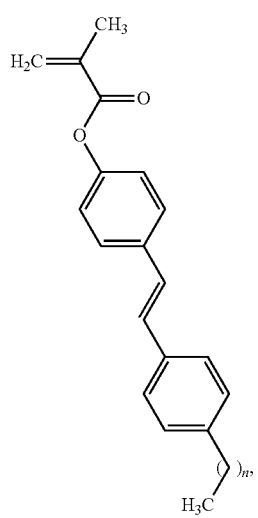
Chemical Formula 8
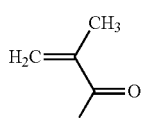
Chemical Formula 9
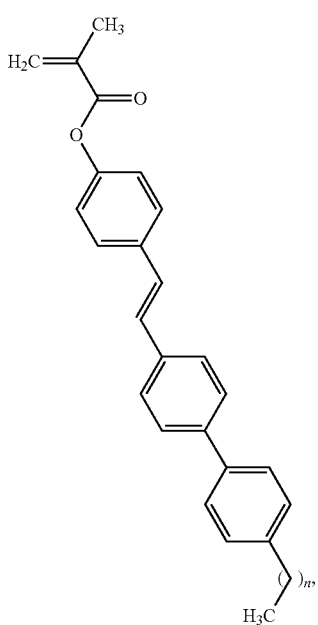

Chemical Formula 10

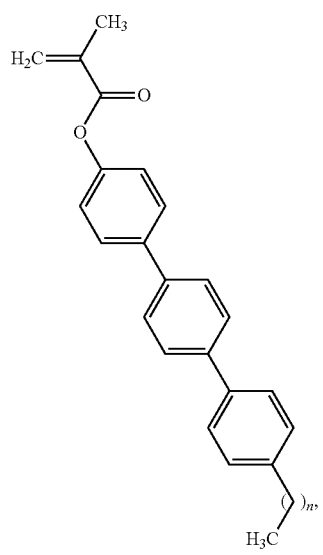

Chemical Formula 11

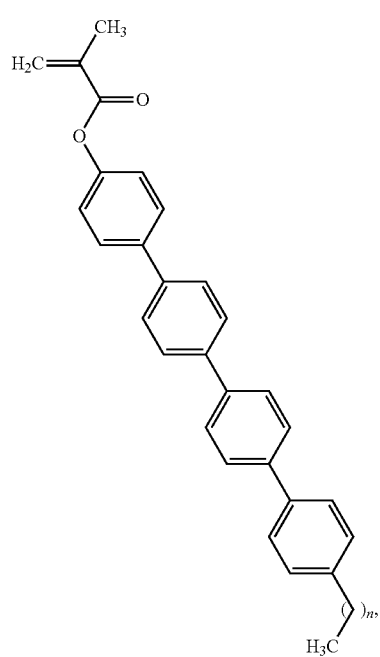

Chemical Formula 12

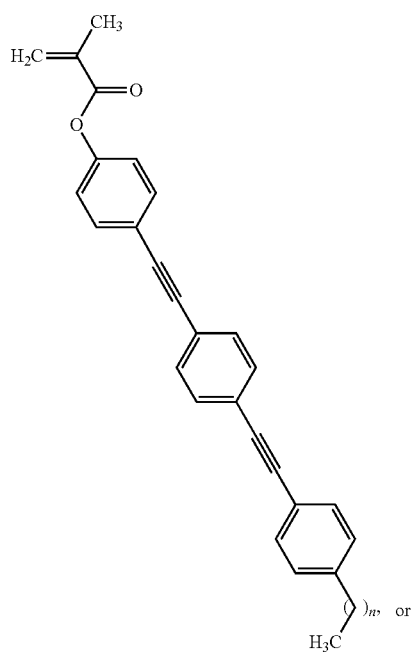

Chemical Formula 13

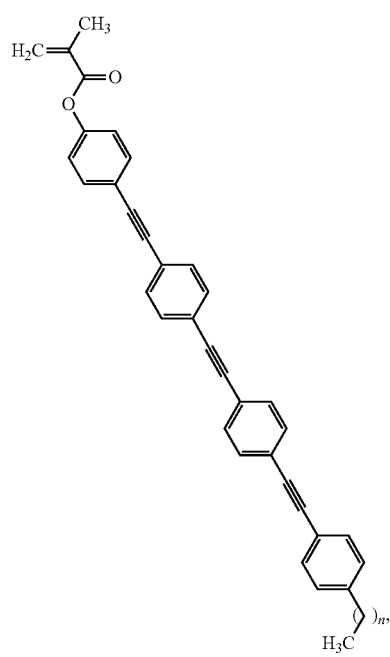

wherein each n is independently 3 to 18.

2. The liquid crystal composition of claim 1, wherein:
the first alignment aid is photoreactive in a visible ray region, and the second alignment aid is photoreactive in an ultraviolet ray region.

3. The liquid crystal composition of claim 1, wherein:
the second alignment aid includes at least one of the compounds represented by the following Chemical Formulas 14 to 18:

Chemical Formula 14

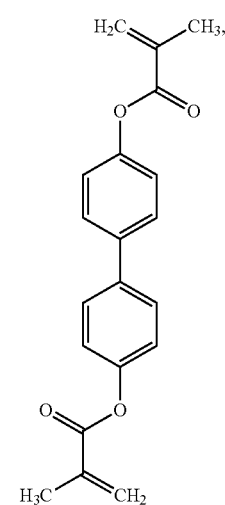

Chemical Formula 15

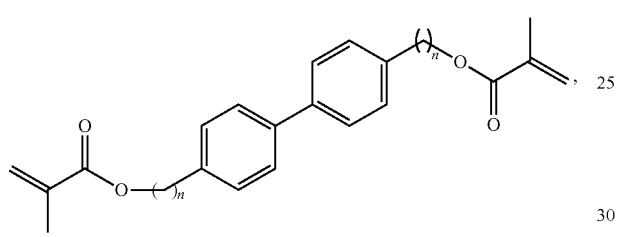

Chemical Formula 16

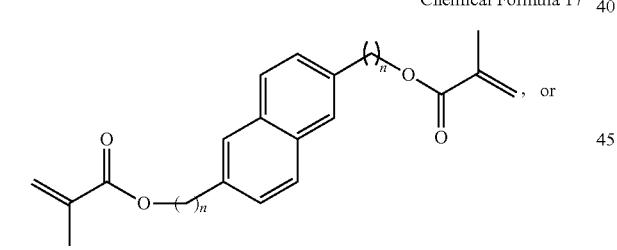

Chemical Formula 17

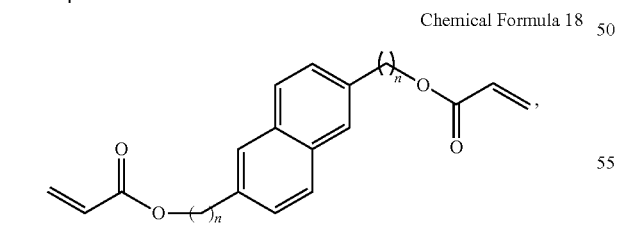

Chemical Formula 18

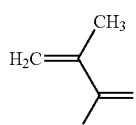

wherein each n is independently 0 to 5.

4. The liquid crystal composition of claim 3, wherein:
a content of the first alignment aid is 0.5 wt % or more and 30 wt % or less in the liquid crystal composition.

5. The liquid crystal composition of claim 4, wherein:
a content of the second alignment aid is about 0.1 wt % or more and about 10 wt % or less in the liquid crystal composition.

6. A liquid crystal composition comprising:
liquid crystals;
a first alignment aid; and
a second alignment aid,
wherein the first alignment aid and the second alignment aid are photoreactive in different wavelength regions,
wherein the first alignment aid is a vertical alignment component, and the second alignment aid is a pretilt component, and the first alignment aid and the second alignment aid are separated from each other, and
wherein the first alignment aid is:

Chemical Formula 10

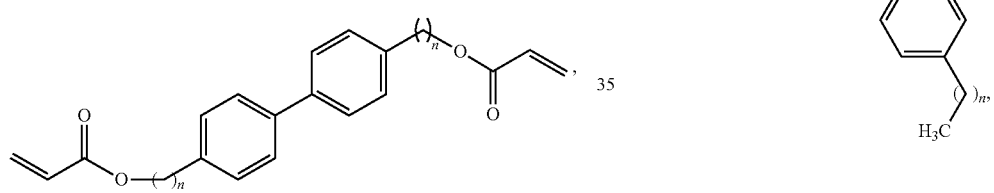

wherein n is 3 to 18, and
the second alignment aid includes at least one of the compounds represented by the following Chemical Formulas 14 to 18:

Chemical Formula 14

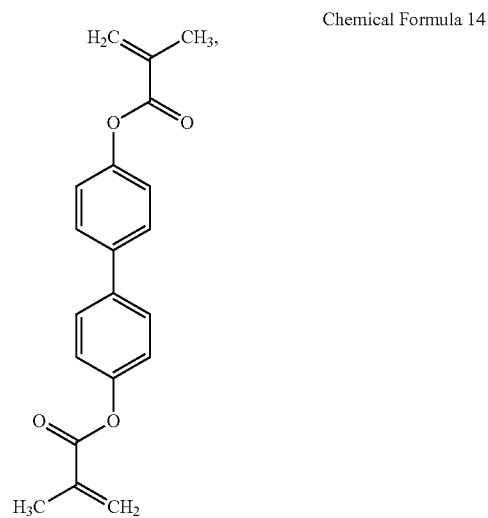

Chemical Formula 15
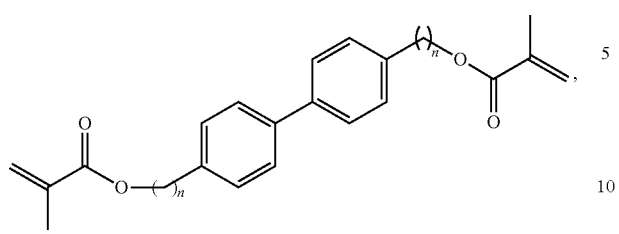
Chemical Formula 16
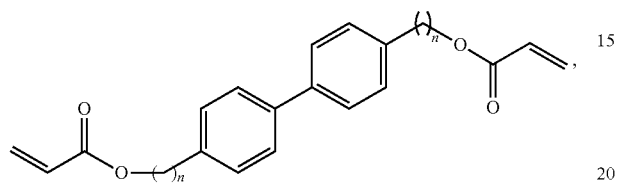
Chemical Formula 17
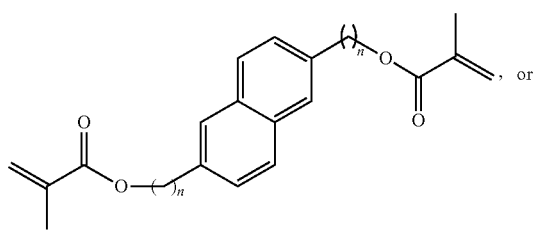
, or
Chemical Formula 18
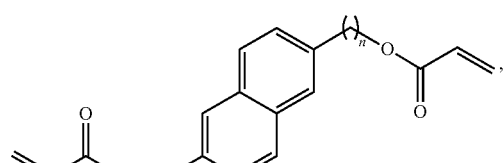
wherein each n is independently 0 to 5.
* * * * *